US009663972B2

(12) United States Patent
Ullrich et al.

(10) Patent No.: US 9,663,972 B2
(45) Date of Patent: May 30, 2017

(54) METHOD AND SYSTEM FOR OPERATING AN ELECTRONIC LOCK

(75) Inventors: Theodore Ullrich, Brooklyn, NY (US); John McLeod, Toronto (CA); Tonino Sabelli, Oakville (CA); Dean Dipietro, Toronto (CA); Pepin Gelardi, Brooklyn, NY (US)

(73) Assignee: WESKO LOCKS LTD., Mississauga, Ontario (CA)

( * ) Notice: Subject to any disclaimer, the term of this patent is extended or adjusted under 35 U.S.C. 154(b) by 0 days.

(21) Appl. No.: 13/468,219

(22) Filed: May 10, 2012

(65) Prior Publication Data

US 2013/0298616 A1 Nov. 14, 2013

(51) Int. Cl.

*G05B 19/00* (2006.01)
*E05B 47/00* (2006.01)
*E05B 65/462* (2017.01)
*E05B 17/22* (2006.01)

(Continued)

(52) U.S. Cl.

CPC ........ *E05B 47/0012* (2013.01); *E05B 65/462* (2013.01); *E05B 17/22* (2013.01); *E05B 63/0056* (2013.01); *E05B 2047/0086* (2013.01); *G07C 9/0069* (2013.01); *Y10T 70/7068* (2015.04)

(58) Field of Classification Search

None

See application file for complete search history.

(56) References Cited

U.S. PATENT DOCUMENTS 3,901,542 A 8/1975 Salzman et al.
4,213,118 A 7/1980 Genest et al.
4,712,398 A 12/1987 Clarkson et al.

(Continued)

FOREIGN PATENT DOCUMENTS

CA 2388230 11/2003
EP 2450509 A2 5/2012

(Continued)

OTHER PUBLICATIONS

Theodore Ullrich et al., U.S. Appl. No. 13/468,240, filed May 10, 2012.

(Continued)

*Primary Examiner* — Nabil Syed
*Assistant Examiner* — Kevin Lau
(74) *Attorney, Agent, or Firm* — Squire Patton Boggs (US) LLP

(57) ABSTRACT

An interchangeable electronic lock includes an electronic access system to activate a motor which powers a gear assembly in the electronic lock. An optional manual bypass allows an operator to override the electronic access. When the lock is activated, the operator manually cranks a lock shaft to lock and unlock a storage unit. A controller selectively operates the motor to move the gear assembly in a linear direction. The gear assembly engages a first portion of a drive assembly with a second portion, to permit manual operation of the lock shaft to lock and unlock the storage unit. An optional modular chassis assembly includes a removable array of components for testing, maintenance and repair. The invention includes a system for operation of the electronic lock, a method of operating the electronic lock and software for operating the electronic lock.

23 Claims, 50 Drawing Sheets

(51) Int. Cl.
*E05B 63/00* (2006.01)
*G07C 9/00* (2006.01)

(56) References Cited

U.S. PATENT DOCUMENTS 4,745,784 A 5/1988 Gartner
4,760,380 A * 7/1988 Quenneville et al. ........ 340/542
4,789,859 A 12/1988 Clarkson et al.
4,887,445 A 12/1989 Beatty
4,901,545 A 2/1990 Bacon et al.
4,931,789 A 6/1990 Pinnow
4,967,305 A 10/1990 Murrer et al.
5,020,345 A 6/1991 Gartner et al.
5,021,776 A 6/1991 Anderson et al.
5,033,282 A 7/1991 Gartner et al.
5,058,258 A 10/1991 Harvey
5,136,870 A 8/1992 Gartner et al.
5,153,561 A 10/1992 Johnson
5,223,829 A 6/1993 Watabe
5,265,452 A 11/1993 Dawson et al.
5,321,963 A 6/1994 Goldman
5,367,295 A 11/1994 Gokcebay et al.
5,437,174 A 8/1995 Aydin et al.
5,475,375 A 12/1995 Barrett et al.
5,479,151 A 12/1995 Lavelle et al.
5,507,162 A 4/1996 Chhatwal
5,552,777 A 9/1996 Gokcebay et al.
5,636,880 A 6/1997 Miller
5,685,182 A 11/1997 Chhatwal
5,749,253 A 5/1998 Glick et al.
5,816,084 A 10/1998 Clark
5,823,027 A 10/1998 Glick et al.
5,848,541 A 12/1998 Glick et al.
5,857,365 A 1/1999 Armstrong
5,886,644 A 3/1999 Keskin et al.
5,887,467 A 3/1999 Butterweck et al.
5,894,277 A 4/1999 Keskin et al.
6,000,609 A 12/1999 Gokcebay
6,016,677 A 1/2000 Clark
6,032,500 A 3/2000 Collard, Jr. et al.
6,092,404 A 7/2000 Chhatwal
6,098,433 A 8/2000 Maniaci
6,116,067 A 9/2000 Myers et al.
D438,447 S 3/2001 Gartner
6,209,367 B1 4/2001 Hyatt, Jr. et al.
6,244,084 B1 6/2001 Warmack
6,297,725 B1 10/2001 Tischendorf et al.
6,318,137 B1 11/2001 Chaum
D452,807 S 1/2002 Gartner
6,374,653 B1 4/2002 Gokcebay et al.
6,384,711 B1 5/2002 Cregger et al.
6,434,987 B1 8/2002 Juillerat et al.
6,487,884 B1 * 12/2002 Constantinou .................. 70/277
6,552,650 B1 4/2003 Gokcebay et al.
6,564,601 B2 5/2003 Hyatt Jr.
6,588,243 B1 7/2003 Hyatt, Jr. et al.
D484,390 S 12/2003 Abernethy et al.
6,655,180 B2 12/2003 Gokcebay et al.
6,722,167 B1 4/2004 Hsu
6,730,867 B2 5/2004 Hyp
6,739,164 B2 5/2004 Warmack
6,745,603 B1 6/2004 Shaw
6,760,964 B1 7/2004 Gartner
6,826,935 B2 12/2004 Gokcebay et al.
D501,388 S 2/2005 Carpintero
6,865,916 B2 3/2005 Goldman
6,876,293 B2 4/2005 Frolov et al.
6,891,458 B2 5/2005 Hyatt, Jr. et al.
6,895,791 B2 5/2005 Alexander et al.
6,926,318 B2 8/2005 Oxley
6,927,670 B1 8/2005 Gokcebay et al.
6,967,562 B2 11/2005 Menard et al.
D512,297 S 12/2005 Metivier et al.
7,010,947 B2 3/2006 Milo
D520,848 S 5/2006 Metivier et al.
7,144,053 B2 12/2006 Bashford
7,209,029 B2 4/2007 Coelho et al.
7,221,272 B2 5/2007 Hosselet
7,296,448 B1 11/2007 Shaw
7,316,139 B2 1/2008 Nakazima et al.
7,334,443 B2 2/2008 Meekma et al.
7,336,150 B2 2/2008 Gokcebay et al.
7,397,343 B1 7/2008 Gokcebay et al.
D580,837 S 11/2008 Kluck
7,469,564 B1 12/2008 Shaw
7,472,934 B2 1/2009 Burke et al.
7,516,633 B1 4/2009 Chang
D593,398 S 6/2009 Pelletier et al.
7,637,131 B2 12/2009 Amir
7,647,797 B1 1/2010 Viso Cabrera et al.
7,747,286 B2 6/2010 Conforti
7,768,378 B2 8/2010 Hill et al.
7,770,423 B2 8/2010 Wu
7,845,202 B2 12/2010 Padilla et al.
7,870,770 B2 1/2011 Blanch
7,891,222 B2 2/2011 Ratkus et al.
8,035,478 B2 10/2011 Lee
8,122,746 B2 2/2012 Hyatt, Jr.
8,141,399 B2 3/2012 Hyatt, Jr.
8,141,400 B2 3/2012 Sorensen et al.
8,161,781 B2 4/2012 Gokcebay
8,176,761 B2 5/2012 Sorensen et al.
8,228,030 B2 7/2012 Pukari et al.
8,276,414 B2 10/2012 Luo
8,468,861 B2 6/2013 Pukari et al.
8,490,443 B2 7/2013 Gokcebay
8,495,898 B2 7/2013 Gokcebay
8,495,899 B2 7/2013 Gartner
8,528,373 B2 9/2013 Hyatt, Jr. et al.
8,683,832 B2 4/2014 Watanabe et al.
8,742,889 B2 6/2014 Kaczmarz et al.
8,866,439 B2 10/2014 Pukari et al.
8,869,574 B2 10/2014 Schmidt-Lackner et al.
8,902,040 B2 12/2014 Greisen et al.
8,970,344 B2 3/2015 Payson et al.
9,208,628 B2 12/2015 Gokcebay
9,222,284 B2 12/2015 Gokcebay
2001/0005998 A1* 7/2001 Imedio Ocana ................ 70/277
2001/0045112 A1 11/2001 Berton et al.
2002/0056300 A1 5/2002 Pierre et al.
2002/0125992 A1 9/2002 Harwood
2004/0003633 A1 1/2004 Alexander et al.
2004/0177660 A1* 9/2004 Tsai ................................ 70/223
2005/0128050 A1 6/2005 Frolov et al.
2005/0179517 A1 8/2005 Harms et al.
2005/0199026 A1 9/2005 Geringer et al.
2005/0253715 A1 11/2005 Awobue
2006/0226948 A1 10/2006 Wright et al.
2006/0238294 A1 10/2006 Gokcebay et al.
2006/0283216 A1* 12/2006 Marcelle et al. ............. 70/38 A
2007/0169525 A1 7/2007 Chang
2007/0209413 A1 9/2007 Dobbs
2007/0257773 A1 11/2007 Hill et al.
2008/0084836 A1 4/2008 Baird et al.
2008/0223093 A1 9/2008 Amir
2008/0252083 A1 10/2008 Carabalona
2008/0296912 A1 12/2008 Whitner et al.
2009/0058102 A1 3/2009 Garneau et al.
2009/0085717 A1* 4/2009 Kirkjan .......................... 340/5.2
2010/0073129 A1 3/2010 Pukari
2010/0079240 A1* 4/2010 Higham ....................... 340/5.54
2010/0300163 A1 12/2010 Loughlin et al.
2010/0307206 A1 12/2010 Taylor et al.
2010/0320971 A1 12/2010 Zhu et al.
2011/0012709 A1 1/2011 Payson et al.
2011/0056253 A1 3/2011 Greiner et al.
2011/0181060 A1 7/2011 Geringer et al.
2013/0043973 A1* 2/2013 Greisen et al. ............. 340/5.51
2013/0298618 A1 11/2013 Gotter
2014/0047878 A1 2/2014 Zheng et al.
2015/0211258 A1 7/2015 Gokcebay

(56) References Cited

U.S. PATENT DOCUMENTS

FOREIGN PATENT DOCUMENTS

| | | | |
|---|---|---|---|
| WO | 0186097 | A2 | 11/2001 |
| WO | 2005/017293 | A1 | 2/2005 |
| WO | 2006/114330 | A2 | 11/2006 |
| WO | 2006114330 | A2 | 11/2006 |
| WO | 2007000576 | A1 | 1/2007 |
| WO | 2010/124851 | A1 | 11/2010 |
| WO | 2011160628 | A1 | 12/2011 |

OTHER PUBLICATIONS

Notice of Allowance U.S. Appl. No. 13/468,240 dated Sep. 9, 2013.

MicroIQ Lock, MicroIQ, http://microiqlock.com/, last visited Nov. 17, 2016.

Codelocks CL2255-BS Electronic Tubular Mortise-Style Keypad Door Lock, Smarthome, http://www.smarthome.com/codelocks-cl2255-bs-electronic-tubular-mortise-style-keypad-door-lock-brushed-steel.html, last visited Nov. 17, 2016.

Lockey M210, GoKeyless, http://www.gokeyless.com/product/43/lockey-m210-keyless-deadbolt, last visited Oct. 11, 2016.

Codelocks KL 1200 Heavy Duty Push Button Electronic Cabinet Lock, American Builders Outlet, http://www.americanbuildersoutlet.com/codelocks-cl1200-heavy-duty-push-button-electronic-cabinet-lock.html, last visited Oct. 11, 2016.

Entry Check TM 923 Narrow Series Digital Keypads, Security Door Controls, http://www.sdcsecurity.com/newproducts.htm, last visited Oct. 11, 2016.

Schlage Sense Smart Deadbolt with Century Trim in Satin Nickel (BE479 CEN 619), Amazon, http://www.amazon.com/dp/B00YUPDUYE?psc=1, last visited Oct. 18, 2016.

Two-Point Electronic Lock Retrofit Kit, System 1000, Chatsworth Products, https://catalog.chatsworth.com/environmental-monitoring-security/electronic-locks/two-point-electronic-lock-retrofit-kit-system-1000, last visited Oct. 11, 2016.

KL 1000 Kitlock Locker Lock, Codelocks, http://www.codelocks.us/kitlock/kl1000-kitlock-locker-lock.html, last visited Oct. 19, 2016.

Browning S&G Retrofit Electronic Lock Kit #156022, Amazon Sports & Outdoors, http://www.amazon.com/Browning-Retrofit-Electronic-Lock-156022/dp/B000PW45C2, last visited Oct. 11, 2016.

Electronic Door Access, Locking Systems, http://www.lockingsystems.com/electronicdooraccess.htm, last visited Oct. 18, 2016.

Push Button Mechanical Lock, Ningbo Yosec Industrial, http://safes-china.en.hisupplier.com/product-1133779-pushbutton-mechanical-lock.html, last visited Nov. 17, 2016.

* cited by examiner

60

Preferred Circuit Board Components

Steps to Open the Lock

Figure 18
KEYPAD LAYERS
FRONT VIEW OF LOCK PRODUCT
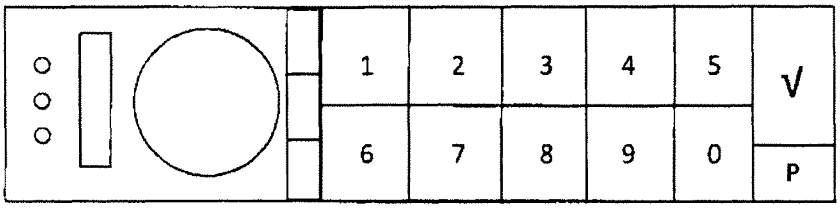
TOP LAYER
Graphics, silicone rubber, translucent LED colors
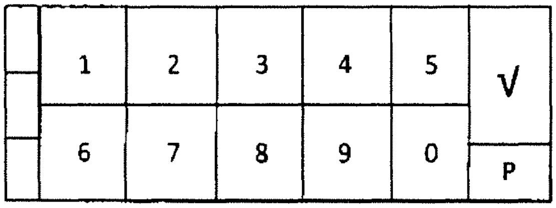
LAYER 2
Membrane Domes and LED Lights
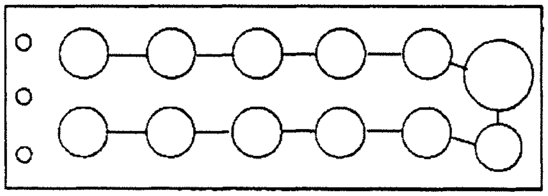

Figure 18-1
KEYPAD LAYERS
LAYER 3 TOP VIEW
Button Circuit and Antenna Lead #1
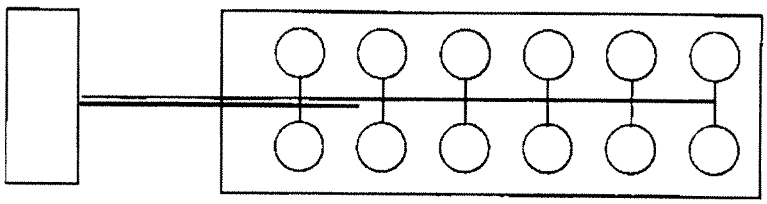
LAYER 3 BOTTOM VIEW
RFID Coli Antenna with Antenna lead #2. Antenna leads pass through layer 3 membrane
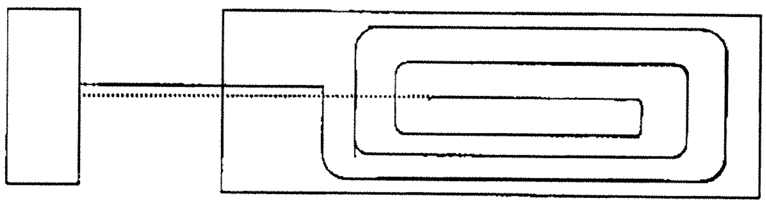
LAYER 4
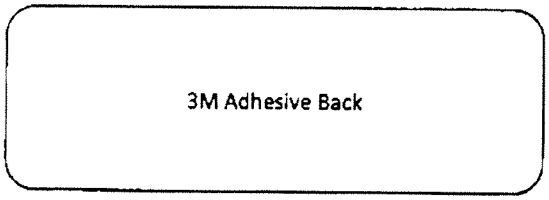

1.) STAT connected to ADC0 on PORT F of AT90USB
The MCP73831T includes a pass transistor, integrated current sensing and reverse-discharge protection.

RFID/NFC Antenna and Circuit Schematic

Continues on Figure 20-1

NOTE: Values shown on Figures 20-2 and 20-3.

RFID/NFC Antenna and Circuit Schematic

NOTE: Values shown on Figures 20-2 and 20-3.

Figure 20-2

RFID/NFC Antenna and Circuit Schematic

Resistor Values

| | |
|---|---|
| R1 | 1.0K |
| R2 | 1.69K |
| R3 | 1.5 |
| R4 | 1.5 |

Capacitor Values

| | |
|---|---|
| C1 | 22pF |
| C2 | 22pF |
| C3 | 220pF |
| C4 | 220pF |
| C5 | NC |
| C6 | NC |
| C7 | 100pF |
| C8 | 100pF |
| C9 | NC |
| C10 | NC |

| | |
|---|---|
| C11 | 0.1μF |
| C12 | 18pF |
| C13 | 18pF |
| C14 | 0.1μF |
| C15 | 1000pF |
| C16 | 0.1μF |
| C17 | 0.1μF |
| C18 | 10μF |
| C19 | 10μF |
| C20 | 0.1μF |

| | |
|---|---|
| C21 | 10μF |
| C22 | 10μF |
| C23 | 0.1μF |
| C24 | 0.1μF |
| C25 | 10μF |

Crystal Value

| | |
|---|---|
| Y1 | 27.12 MHz |

Figure 20-3

RFID/NFC Antenna and Circuit Schematic

RFID Circuit Connections

| | |
|---|---|
| 1 | DGND |
| 2 | LOADMOD |
| 3 | TGND1 |
| 4 | TX1 |
| 5 | TVDD |
| 6 | TX2 |
| 7 | TGND2 |
| 8 | AVDD |
| 9 | VMID |
| 10 | RX |

| | |
|---|---|
| 11 | AGND |
| 12 | AUX1 |
| 13 | AUX2 |
| 14 | XTAL1 |
| 15 | XTAL2 |
| 16 | I0 |
| 17 | I1 |
| 18 | TESTEN |
| 19 | P35 |
| 20 | NC1 |

| | |
|---|---|
| 21 | NC2 |
| 22 | NC3 |
| 23 | PVDD |
| 24 | P30/UART_RX |
| 25 | IRQ |
| 26 | RSTOUT_N |
| 27 | NSS/P50_SCL/HSU_TX |
| 28 | MOSI/SDA/HSU_TX |
| 29 | MISO |
| 30 | SCK |

| | |
|---|---|
| 31 | P31 |
| 32 | P32 |
| 33 | P33 |
| 34 | P34/SIC_CLK |
| 35 | SIGOUT |
| 36 | SIGIN |
| 37 | SVDD |
| 38 | RSTPD_N |
| 39 | DVDD |
| 40 | VBAT |

Figure 23

PREFERRED SOFTWARE

Programming Commands

- Toggle security lockout mode on or off
- Display approximate battery charge level
- Add or remove users to database
- Add or remove master users to database
- Switch lock mode: corporate, public locker or other security profiles
- Change password length from 4 to 10 digits
- Toggle sound on or off
- Add or remove temporary password(s)
- Add or remove valid date(s) and time range(s)
- Add or remove RFID Tag(s)
- Add or remove NFC Tag(s)
- Enable or disable RFID mode
- Enable or disable NFC mode
- Activate USB connect
- Update software revision via USB connect
- Update data values via USB connect
- Activate USB Host Other versions of the software may be provided to incorporate new rules and lock logic.

Figure 24

PREFERRED SOFTWARE

MC Database Files

- User codes with privileges (master or user)
- Keystroke log file including keystrokes with date & time stamp and status (success/fail)
- Lock information including serial number, data values and battery charge level

METHOD AND SYSTEM FOR OPERATING AN ELECTRONIC LOCK

FIELD OF THE INVENTION

The invention relates to locking mechanisms used in filing and storage cabinets, office furniture, storage compartments, including built in cabinets, and other lockable storage units.

BACKGROUND OF THE INVENTION

Many furniture manufacturers and their customers desire electronic locking mechanisms that use a keypad or other electronic means, such as an RFID Card reader or other security scanner, rather than traditional mechanical locks, to access and secure their office furniture and other kinds of storage units. In many instances, electronic locks are desirable to avoid the costs and inconvenience associated with replacing lost keys, rekeying locks because of staffing changes or security breaches, and the like. Manufacturers and users often prefer programmable electronic locks which can be reprogrammed to deal with staffing changes, and other security concerns, and to, for example, monitor access and usage of the locking devices, and the associated storage units.

Electronic locks in the prior art have been used to provide secure storage and access control in office furniture, storage cabinets and other compartments. These prior art locks have special latching mechanisms and housings which require the furniture manufacturers and others to make tooling changes to their furniture or make other potentially time consuming, difficult, and costly adaptations to accept the special locking mechanisms and housings of these prior art locks as replacements for pre-existing locking systems.

By way of example, FIG. 1 in published US Patent Application 2011 0056253 shows such an electronic lock with a unique housing and latching apparatus. FIGS. 1, 2, 3 and 4 of U.S. Pat. No. 6,655,180 also show an electronic lock with a unique housing and latching system requiring custom installation.

Similarly FIG. 5 of U.S. Pat. No. 5,886,644 shows a unique installation of outer and inner housings for an electronic lock.

Furthermore, neither of these locks can be used with lateral filing cabinets or pedestal drawers because they cannot be easily adapted to existing central locking systems.

Canadian Patent No. 2,388,230 shows an example of a mechanical lock used in a central locking application for a lateral filing cabinet or other storage unit. In FIGS. 1 and 2 of that Patent, the mechanical lock is shown with a zigzag shaped lock shaft and a round retainer. The illustrated lock shaft is connected to a locking core which is included in a standard "Double D" lock housing unit. An example of this mechanical lock is shown as being installed in a conventional 2 drawer locking cabinet.

Prior art locking systems come in various shapes, sizes and configurations. Many of these prior art locking systems include multi component drawer slide locking arrays.

Therefore, it is desirable to provide a new electronic locking system that is conveniently interchangeable with existing mechanical locks without requiring costly tooling changes by office furniture manufacturers, and without using difficult or complicated installation procedures by installers, customers or other users.

By way of example, it is preferable that an electronic lock include a replaceable or interchangeable driver selected from a group of preselected drivers of different shapes, sizes, and configurations, the group being compatible for use with a plurality of tenons, cranks, linkage bars and other components in locking systems which are widely used in many standard locking applications within the industry.

In some instances, electronic locks of the prior art include a solenoid device operating with a linear action. Typically, this linear action engages or disengages a latching bolt or engages a shear pin to prevent a knob from turning.

Often, these prior electronic locks use a substantial number of batteries connected in series and require a large housing to store the batteries. Typically, these batteries require frequent replacement. Solenoid motors are not generally recommended for locking applications because their performance may be affected, or security features may be compromised, by strong magnets which may be brought into close proximity to the solenoid motors.

Many electronic locks in the prior art use DC motors to drive their latching mechanisms. US Patent Application 2007/0257773 Brian Hill et al shows an example of such a mechanism. The motor required to rotate the gear train including 7 gears draws a significant current and requires a large battery capacity. Typically this type of electronic lock requires 4 or more "AA" batteries which are installed in a separate housing inside the storage cabinet. The service life of these batteries is such that the batteries must be replaced frequently, thus leading to increased operating costs for users of these electronic locks.

In some prior art electronic locks, piezo-electric motors may be used to drive the latching mechanisms. However, such piezo-electric motors are typically more expensive than other conventional electric motors. In addition, piezo electric motors typically draw substantial electric currents, thus leading to shortened battery life and increased operating costs associated with frequent replacement of batteries.

Further, these prior electronic locks often utilize latches and detents to ensure that the lock can either be in a locked position, or in an unlocked position, to avoid a continuous application of electrical power from a substantial battery power supply.

Accordingly, it is also desirable to provide an electronic lock design which avoids a substantial consumption of electrical power.

It is also desirable to provide a compact electronic lock design.

It is also desirable to provide an alternative electronic lock design with enhanced security features.

It is also desirable to provide an electronic lock design, preferably with programmable features, to enable users to adapt the electronic lock to meet one or more user needs.

It is desirable to provide an electronic lock design which incorporates one or more of the foregoing features, or other useful features.

SUMMARY OF THE INVENTION

In one aspect, an electronic lock is designed to be installed in a storage unit. When installed, the electronic lock is operationally associated with a locking assembly (for example, a locking bar assembly) for locking and unlocking a storage unit (for example, storage units suitable for one or more storage compartments). In this aspect, the electronic lock includes a lock housing which can be releasably secured to the storage unit. The electronic lock may be adapted for use in retrofit installations, as a replacement for previously installed locks, or as an original equipment manufacturers' (OEM) component.

Various features and components may be used to releasably secure the electronic lock housing to a storage unit. Fasteners, couplings, quick connect and other elements may be provided to secure the electronic lock, yet allow the manufacturer, installer or other user to remove the electronic lock, if replacement, repair or removal for some other reason, is desired.

It is preferable that the housing is replaceable or interchangeable with other housings selected from a group of preselected housings of different shapes, sizes, and configurations, the group being compatible for use with a plurality of other locking systems which are widely used in many standard locking applications within the industry.

The electronic lock includes a driver to operationally engage the locking assembly. Typically, the driver moves between a first driver position and a second driver position. In the first driver position, the locking assembly is in the locked position. In the second driver position, the locking assembly is in the unlocked position.

Preferably, the driver is replaceable or interchangeable with other drivers selected from a group of preselected drivers of different shapes, sizes, and configurations, the group being compatible for use with a plurality of tenons, cranks, linkage bars and other components in locking systems which are widely used in many standard locking applications within the industry.

A drive shaft assembly is protected in the housing. The drive shaft assembly is adapted to be selectively and operationally engaged with the driver. For example, an operator may select a locked position for the electronic lock in which the drive shaft assembly will not activate the locking assembly in the storage unit. In one mode, such as for example, when the electronic lock is in the locked position, the drive shaft assembly is operationally disengaged from the driver so that the driver is unable to lock or unlock the locking assembly in the storage unit. Similarly, by way of example, the operator may select an unlocked position for the electronic lock in which the drive shaft assembly may be operationally engaged with the driver, so that the operator may manually unlock the locking assembly.

The electronic lock includes a gear segment assembly which moves between a first gear segment position and a second gear segment position. In the first gear segment position, the drive shaft assembly is operationally disengaged from the driver. In the second gear segment position, the drive shaft assembly is operationally engaged with the driver.

The electronic lock also includes an electronic access control to operate the gear segment assembly between the first gear segment position and the second gear segment position. The electronic access control will, often, but not necessarily, include an operator activation device such as a programmable keypad or a programmable access card reader (for example, and RFID card reader). The electronic access control may include an electric motor in combination with a rechargeable or replaceable battery power source. The electric motor may be used to move the gear segment assembly to the second gear segment position, so that the operator may operationally engage the driver, to, in turn, operate the locking assembly between a first position in which the locking assembly is “locked” (for example, to prevent opening of the storage unit) and a second position in which the locking assembly is unlocked (so that the locking assembly may be moved by the operator, between the locked and unlocked positions).

In a preferred embodiment, when the electronic lock is in the unlocked mode, and the electric motor has moved the gear segment assembly to the second gear position, the operator may manually operate the driver by rotational movement, or other movement, of the drive shaft assembly. Preferably, the motor may be used sparingly to operate the gear segment assembly, without operating the entire drive shaft assembly, to reduce power consumption and thus, prolong battery life, or reduce the frequency of battery recharging or replacement.

A port, such as a USB port, may be provided to allow convenient recharging of a suitable rechargeable battery and to allow data storage, data access or exchange with the electronic access control.

The electronic lock in this aspect also includes a manual activation assembly which is operationally connected to the driver when the gear segment assembly is in the second gear segment position. In this mode, the operator may manually operate the driver between the first driver position and the second driver position. In preferred embodiment, the manual activation assembly includes a manually operated knob which the operator may rotate, to move the drive shaft assembly and to operate the driver so that the locking assembly may be operated between its locked position and its unlocked position.

The manual activation assembly may also provide a bypass feature. In certain situations, for example, when the motor in the electronic access control is not operational (or for administrative convenience), the bypass feature may be activated to permit the operator to manually operate the drive shaft assembly, without using the motor to move the gear segment assembly to the second gear segment position. In some instances, the bypass feature may allow the operator to manually move the gear segment assembly to the second gear segment position (for example, when the motor is not operational). In other embodiments, the bypass feature may allow the operator to activate other elements to operationally engage the drive shaft assembly with the driver. In some instances, the bypass feature may operationally engage the drive shaft assembly with the driver without activating or moving the gear segment assembly to the second gear segment position.

For example, in some embodiments, the bypass feature may include a key activated locking core to operationally engage the drive shaft assembly with the driver, without moving the gear segment assembly. The operating key may be inserted by the operator into the locking core, to turn the drive shaft assembly, and in turn, move the driver so that the locking assembly in the storage unit may be moved between the locked and unlocked positions.

In another aspect, an electronic lock operates between a locked position and an unlocked position, to allow an operator to lock and unlock a storage unit. In this aspect, the electronic lock comprises:

- A lock housing which may be used to secure the electronic lock to the storage unit;
- A driver which operationally engages with a locking assembly in the storage unit to lock and unlock the locking assembly;
- A drive shaft assembly which is located in the housing to selectively and operationally engage with the driver;
- An electronic access control which operates a gear segment assembly. The gear segment assembly operates between a first gear segment position and a second gear segment position. In the first gear segment position, the drive shaft assembly is operationally disengaged from the driver when the electronic lock is in the locked position. In the second gear segment position, the drive shaft assembly is operationally engaged with the driver when the electronic lock is in the unlocked position; and A manual activation assembly which is operationally connected to the driver when the gear segment assembly is in the second gear segment position. When the gear segment assembly is in the second gear segment position, an operator may manually operate the driver between the first driver position and the second driver position.

In yet another aspect, an electronic lock operates between a locked position and an unlocked position to lock and unlock a locking assembly in a storage unit. In this aspect, the electronic lock may include:

A lock housing for secure releasable engagement with the storage unit;

A drive shaft in the housing, in which the drive shaft includes:

A first shaft segment secured to a removable driver for engagement with the locking assembly;

A second shaft segment which is operationally disconnected from the first shaft segment in a first mode, and the second shaft segment is operationally connected to the first shaft segment in a second mode;

An electronic access control to operate a gear segment assembly between a first gear segment position and a second gear segment position; in the first gear segment position, the second shaft segment is operationally disconnected from the first shaft segment; in the second gear segment position, the second shaft segment is operationally connected to the first shaft segment;

The electronic access control may include:

a programmable keypad or a card reader to activate a battery powered motor for operation of the gear segment assembly between the first gear segment position and the second gear segment position; and A third shaft segment which may be provided in a manual activation assembly for manual rotational operation of the drive shaft when (a) the gear segment assembly is in the second gear segment position, or (b) the manual activation assembly is in a bypass mode to operate the first shaft segment without activating the battery powered motor.

By way of example, in some embodiments, the third shaft segment may include a keyed locking core configured to operate the drive shaft without activating the electronic access control or without drawing power from a battery power source to operate an electric motor or other electronic components. In other embodiments, the third shaft segment may be configured to operate separately from the manual activation assembly. In some instances, one or more of the shaft segments may be constructed from multiple components or pieces.

The invention includes a method of operating the electronic lock including the steps of:

enabling a passcode for motorized operation of a gear assembly in the electronic lock between a disengaged position and an engaged position, wherein:

in the disengaged position, a manual drive assembly in the electronic lock is disengaged from a lock assembly in a storage unit; and in the engaged position, the manual drive assembly is engaged with the lock assembly, to permit manual movement of the manual drive assembly between a first position in which the lock assembly is in a locked position, and a second position in which the lock assembly is in an unlocked position.

The passcode may be provided to the electronic lock by manually entering the passcode via a keypad, or by communication with a permitted electronic device. For example, the passcode may be scanned by a card reader, or the passcode may be detected by communication with a computer, smartphone, an RFID enabled device, an NFC device, or other type of device capable of communicating the passcode to the electronic lock, or more particularly, to a controller in the electronic lock.

In another aspect, the method includes applying power to a motor for linear movement of a gear assembly to engage the drive assembly with the locking system in the storage unit. The method may include switching steps to stop the application of power to the motor when the gear assembly has completed a movement of the gear assembly between the disengaged position and the engaged position.

In another aspect of the invention, the motorized movement of the gear assembly between the disengaged position and the engaged position corresponds to an operational engagement of a first portion of the drive assembly with a second portion of the drive assembly. In the disengaged position, the manual drive assembly will not operate the locking system between the locked position and the unlocked position. In the engaged position, the first portion is engaged with the second portion of the drive assembly, permitting the user to operate the locking system between the locked and unlocked position, to allow the user to gain access to the storage unit.

The method may include storing data relating to the operation of the electronic lock in a memory element (such as for example, a removable flash drive, memory card, or some other compatible memory element).

The method may also include activating a manual bypass element, to permit manual operation of the locking system, without operating the motor to engage or disengage the gear assembly with the manual drive assembly.

The invention includes a system for operating an electronic locking system in a storage unit. The system may include:

a motor to operate a gear assembly in the electronic lock between a disengaged position and an engaged position;

a controller to selectively apply power to a motor for operation of the gear assembly between the disengaged position and engaged position; and a manual drive assembly in the electronic lock for selective engagement and disengagement from a lock assembly in a storage unit, permitting a user to move the lock assembly between a locked position and an unlocked position.

The system may also include a manual bypass to permit access to the electronic lock without motorized operation of the gear assembly.

The manual bypass may be lockable to prevent unauthorized use of the manual bypass to operate the manual drive assembly.

The system may include an electrical component selected from the group of components consisting of:

a battery providing a power reservoir for operation of the motor;

a switch associated with the motor, to affect the operation of the motor according to the position of the gear assembly;

- a switch to shut off power to the motor after the gear assembly has moved between the disengaged position and the engaged position;
- a memory device for storing data associated with the electronic lock;
- a data access port associated with the memory device;
- a real time clock for associating real time data with use of the electronic lock;
- an access element selected from the group of elements consisting of: a keypad for entering a predetermined access code; a device reader; and a receiver to receive an access code from a permitted electronic device.

Other methods, systems, and software will also be readily apparent to persons skilled in the art, having regard to the more detailed description provided herein.

There are other possible embodiments of this invention which may include interchangeable drivers, interchangeable housings, electronic access control features which may include a programmable keypad, a programmable card reader, a manual bypass feature, a removable chassis, interchangeable electronic components including a controller and modular circuits, and one or more of the other features described elsewhere within this specification. An optional modular chassis assembly may also be provided in which a removable array of components are assembled in a modular format for testing, maintenance, repair, convenience, or improved quality control during assembly of the electronic lock. A preferred embodiment of the invention is described having regard to the following drawings.

Other aspects of the invention will become apparent to those persons who are skilled in the art upon reading the following detailed description, drawings and appended claims.

BRIEF DESCRIPTION OF THE DRAWINGS

FIG. 4-1 shows a partial interior view of the Electronic Lock of FIG. 3 to illustrate an example of the Motor and Gear Assembly.

FIG. 4-2 shows a partial interior top view, in perspective, of the Electronic Lock of FIG. 3 to illustrate an example of the circuit board assembly.

FIG. 4-3 shows a partial interior bottom view, in perspective of the Electronic Lock of FIG. 3 to illustrate the example of the circuit board assembly.

FIG. 6-1 shows examples of fully assembled Electronic Locks with different embodiments of the Lock Drive Shaft.

FIG. 6-2 shows examples of different embodiments of the Lock Drive Shaft.

FIG. 7-1 shows the steps to open an embodiment of the Electronic Lock.

FIG. 7-2 shows the steps to close an embodiment of the Electronic Lock.

FIG. 8-1 shows a partial interior view of the illustrated embodiment of the Electronic Lock in the Fully Locked Position.

FIG. 8-2 shows a partial interior view of the illustrated embodiment of the Electronic Lock as the Motor begins to rotate.

FIG. 8-3 shows a partial interior view of the illustrated embodiment of the Electronic Lock after the motor is fully rotated and the Manual Knob is ready to be turned.

FIG. 8-4 shows a partial interior view of the illustrated embodiment of the Electronic Lock as the user begins turning the Manual Knob.

FIG. 8-5 shows a partial interior view of the illustrated embodiment of the Electronic Lock in the fully opened position.

FIG. 10-1 shows an exploded front view, in perspective, of a modular chassis assembly in the Electronic Lock.

FIG. 10-2 shows an exploded rear view, in perspective, of the modular chassis assembly illustrated in FIG. 10-1.

FIG. 10-3 shows a front view, in perspective, of the assembled modular chassis assembly illustrated in FIGS. 10-1 and 10-2.

FIG. 11-1 shows a front view of a partial section, in perspective, of the modular chassis assembly, when the key and the locking core are partially rotated.

FIG. 11-2 shows a rear view of a partial section, in perspective, of the modular chassis assembly, when the key and the locking core are partially rotated as illustrated in FIG. 11-1.

FIG. 12-1 shows a front view of a partial section, in perspective, of the modular chassis assembly, when the key and the locking core are rotated 180 degrees in a clockwise direction.

FIG. 12-2 shows a rear view of a partial section, in perspective, of the modular chassis assembly, when the key and the locking core are rotated 180 degrees as illustrated in FIG. 12-1.

FIG. 13-1 shows a front view, in perspective, of the locking core assembled with the inner cam.

FIG. 13-2 shows an exploded front view, of the locking core and the inner cam illustrated in FIG. 13-1.

FIG. 13-3 shows a rear view of the locking core, and a front view of the inner cam, to illustrate the mating features of these two components.

FIG. 15-1 is a plan view of selected components in the modular chassis assembly, illustrating the interaction between the drive gear assembly and a visual indicator, showing the position of the drive gear assembly.

FIG. 15-2 is a rear view, in perspective, of the selected components in the modular chassis assembly, illustrated in FIG. 15-1.

FIGS. 17-1 and 17-2 are flowcharts representing the operational steps of the microcontroller switches of the present invention, in opening a preferred embodiment of the invention.

FIG. 17-3 is a flowchart representing the operational steps of the microcontroller switches of the present invention, in closing a preferred embodiment of the invention.

FIGS. 18 and 18-1 are illustrations of the component layers of an example of a keypad assembly included in an embodiment of the present invention.

FIGS. 19-1 to 19-12 illustrate schematic representations of the components in a preferred microcontroller controller circuit board of the present invention.

FIG. 19-1 is a schematic drawing of a preferred (AT90USB) microcontroller circuit.

FIG. 19-2 is a schematic drawing of a keypad connection circuit.

FIG. 19-3 is a schematic drawing of an audible buzzer circuit.

FIG. 19-4 is a schematic drawing of a microSD card holder circuit.

FIG. 19-5 is a schematic drawing of a voltage regulator circuit.

FIG. 19-6 is a schematic drawing of a circuit comprising the three micro electronic switches 1, 2 and 3 shown in FIG. 16.

FIG. 19-7 is a schematic drawing of the USB port circuit.

FIG. 19-8 is a schematic drawing of the main battery circuit.

FIG. 19-9 is a schematic drawing of the real time clock (RTC) battery backup circuit.

FIG. 19-10 is a schematic drawing of the motor driver circuit.

FIG. 19-11 is a schematic drawing of the real time clock circuit.

FIG. 19-12 is a schematic drawing of the LiPo battery charger circuit.

FIGS. 20 and 20-1 are schematic drawing of an optional microcontroller circuit including RFID and NFC antennas. FIGS. 20-2 and 20-3 are tabled lists of specifications for the circuit components shown in FIGS. 20 and 20-1.

FIG. 23 is a chart illustrating a set of preferred programming commands for an electronic lock of the present invention.

FIG. 24 is a chart illustrating a set of preferred database files for use in association with the microcontrollers in an embodiment of an electronic lock of the present invention.

DESCRIPTION OF A PREFERRED EMBODIMENT OF THE INVENTION

Figure 1:
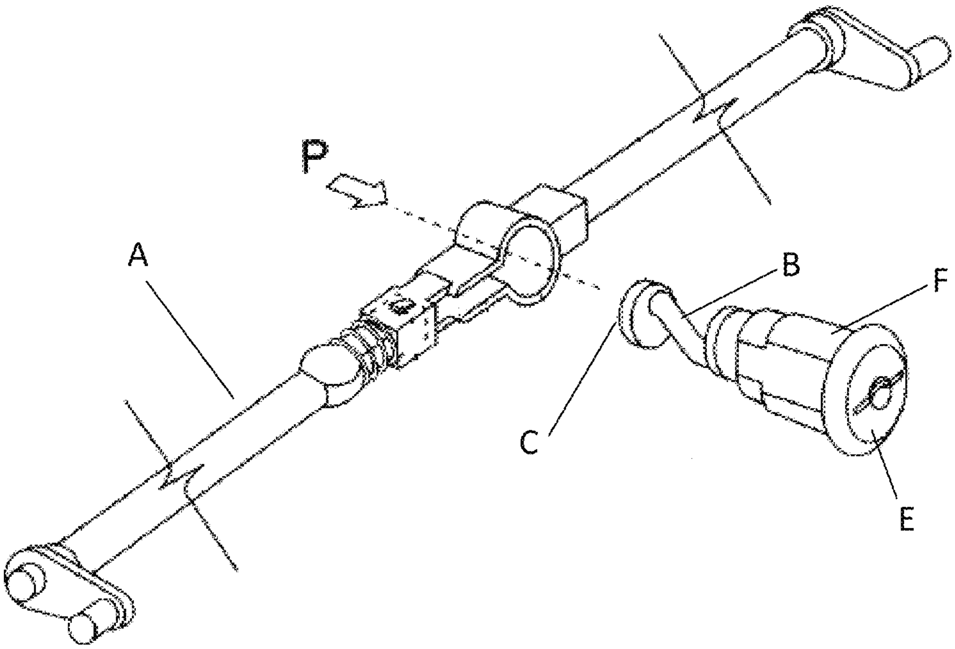
Fig. 1 Prior Art
FIG. 1 shows one embodiment of the prior mechanical locks.
Figure 2:
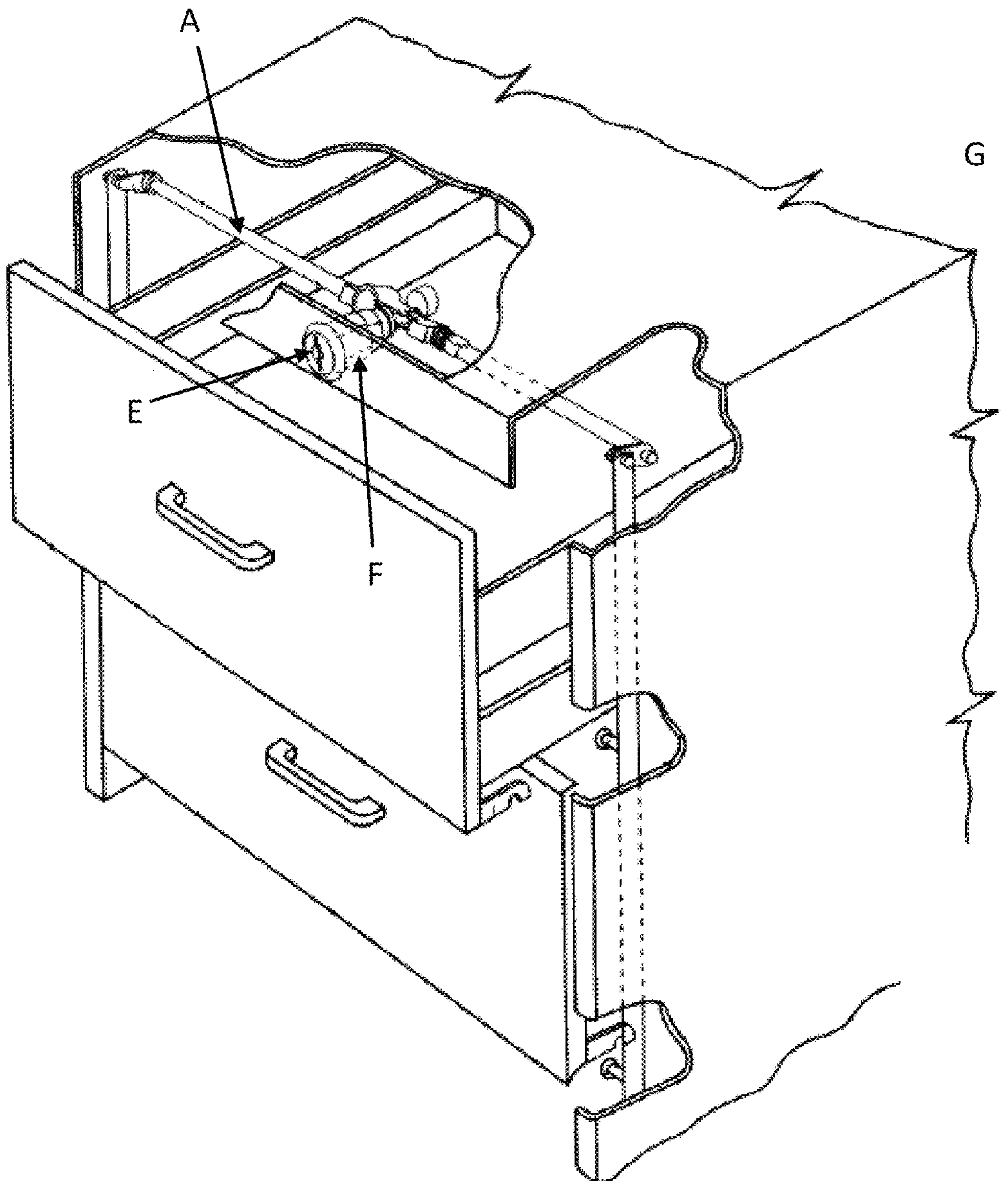
Fig. 2 Prior Art
FIG. 2 shows the prior mechanical lock of FIG. 1 as used in a central locking application for a lateral filing cabinet.

FIG. 1 and FIG. 2 show an embodiment of a prior art latching system illustrated and described in Canadian Patent No. 2,388,230. FIG. 1 and FIG. 2 show one embodiment of an irregularly shaped driver B having a retainer C which is generally circular in cross-section. The mechanical locking system shown in this patent includes a crank arm A with a zigzag configuration. This crank arm A is connected to a key operated locking core E which is included in a standard “Double D” lock housing unit F. This mechanical lock is shown installed in a conventional two drawer locking cabinet G.

Electronic locks of the prior art are not readily or easily adapted for retrofit installation in storage units fitted with prior art latching systems.

FIGS. 3 to 24 show a preferred embodiment of the present invention.

Figure 3:
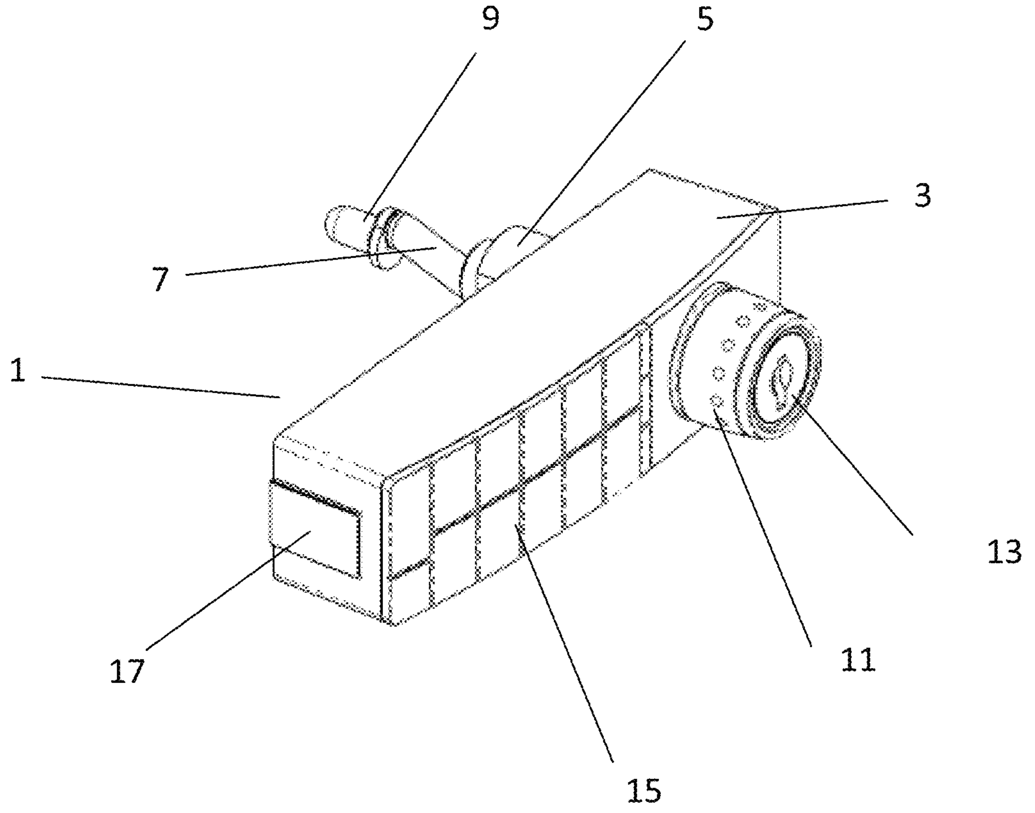
FIG. 3 shows fully assembled preferred embodiment of the Electronic Lock of the present invention.
Figures 1, 4:
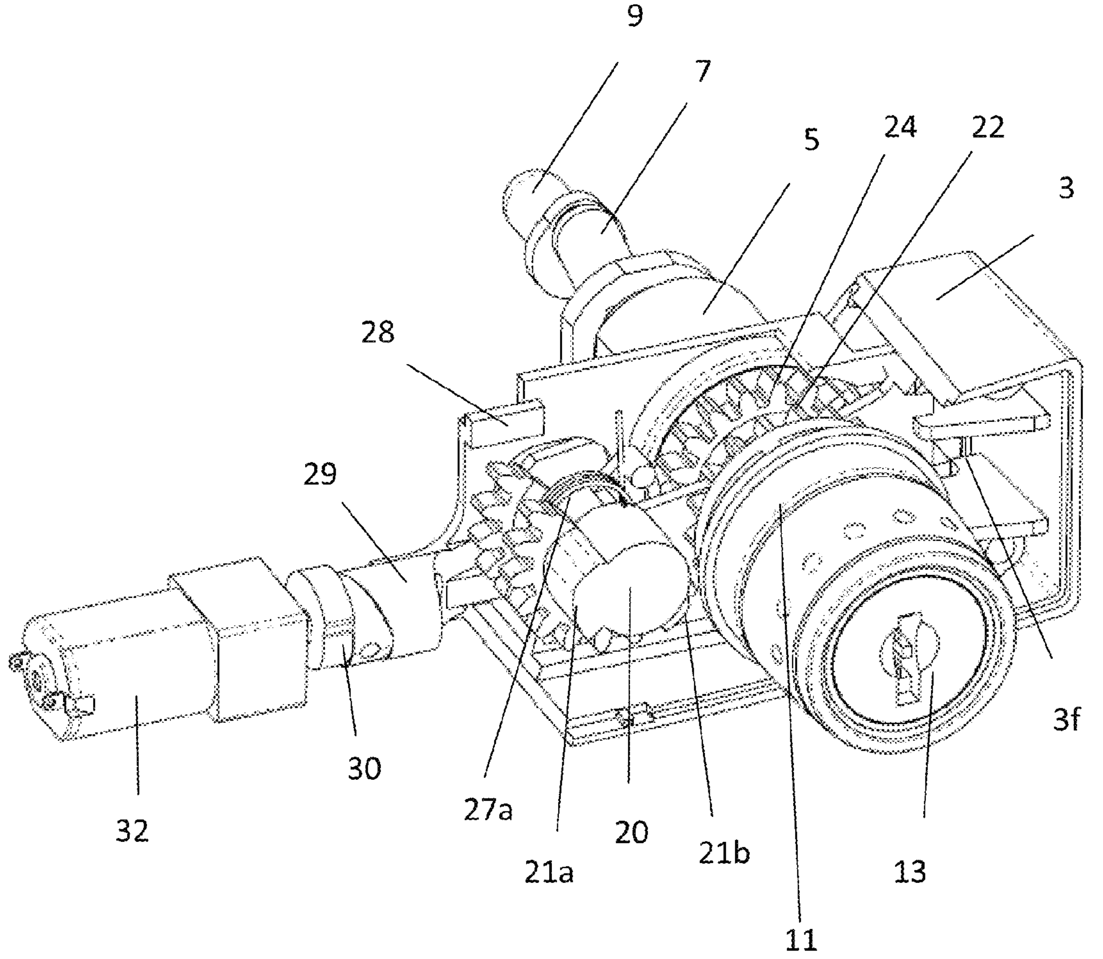
Figures 2, 4:
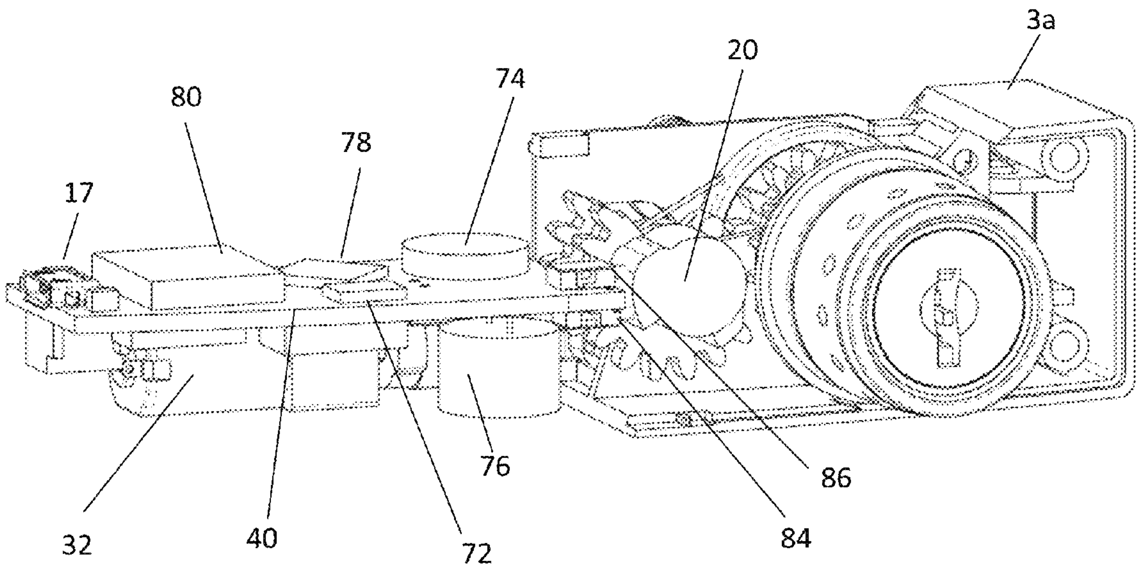
Figures 3, 4:
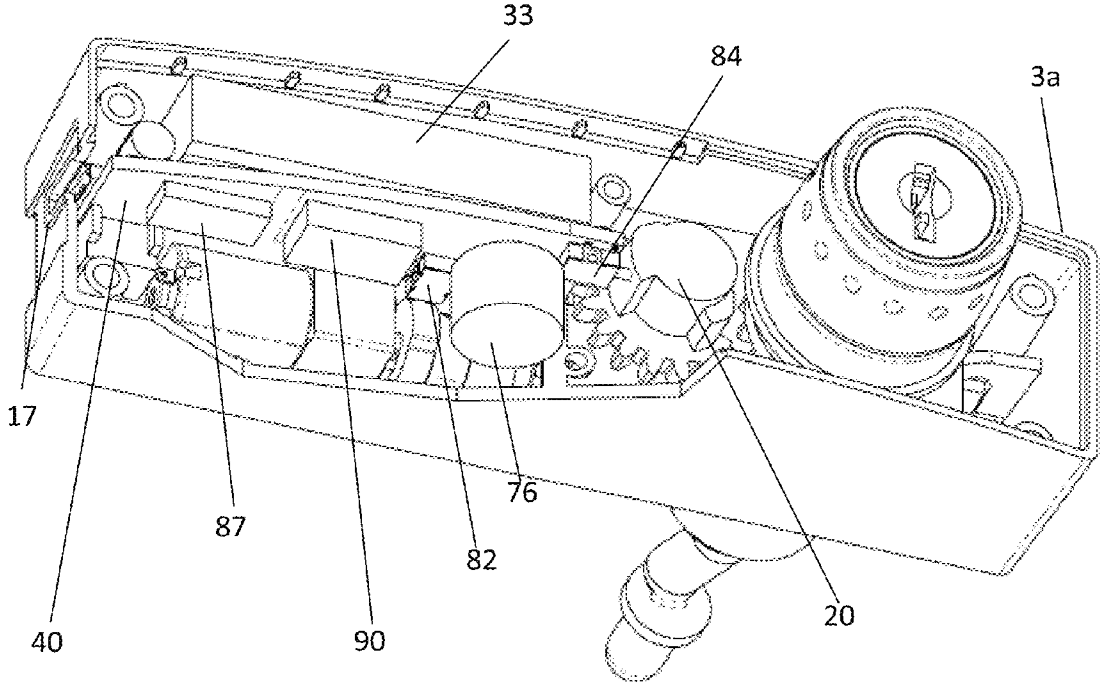
Figure 5:
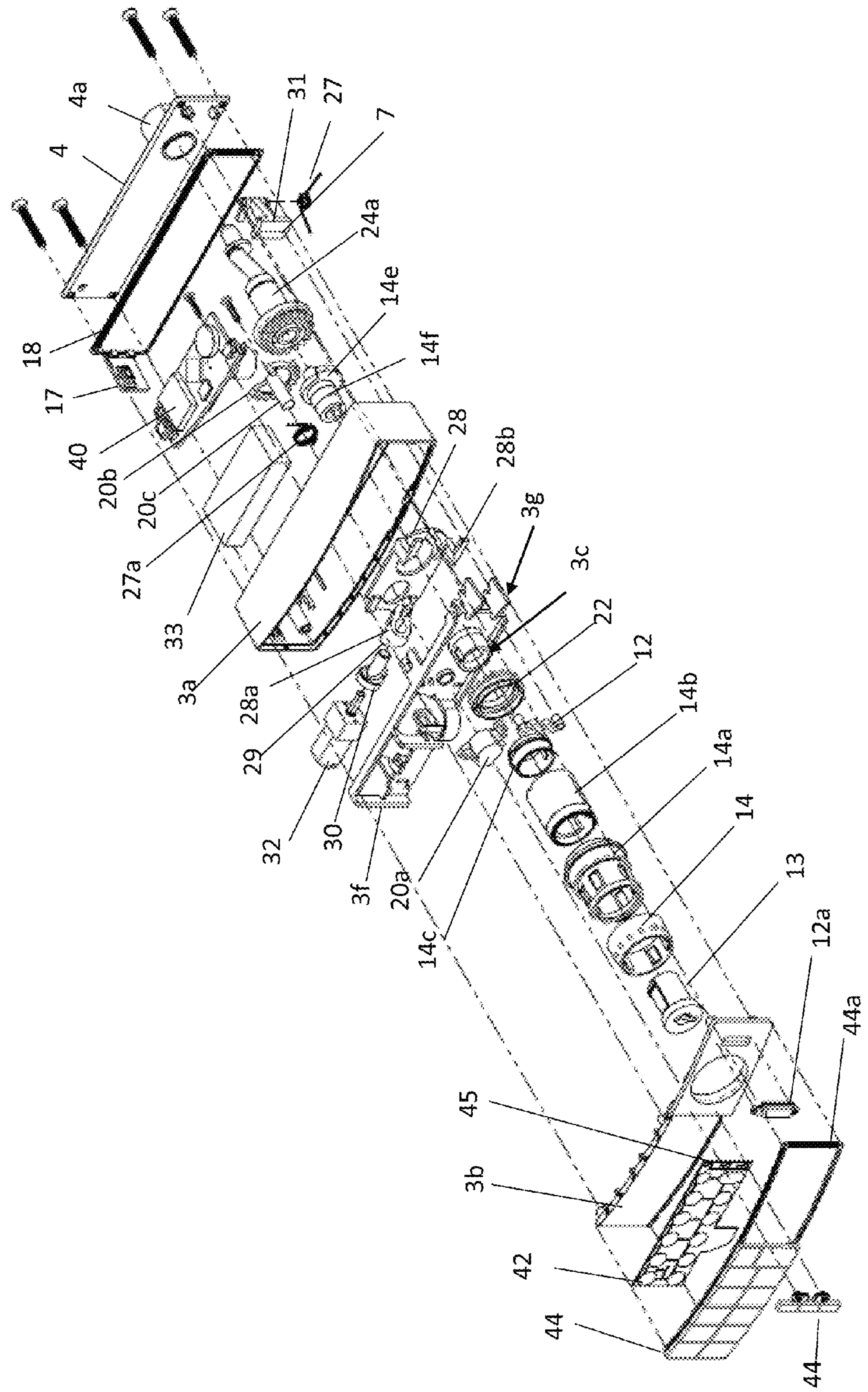
FIG. 5 shows an exploded view of the preferred embodiment of the Electronic Lock.

FIG. 3 shows an exterior view of an electronic lock 1, FIG. 4-1 shows a partial section of the electronic lock 1, and FIG. 5 shows an exploded view of the electronic lock. The electronic lock 1 includes a lock housing 3 with a standard “Double D” configuration lock housing insert 5. The lock housing 3 includes a housing frame 3*a* connected to a housing front plate 3*b*. (Persons skilled in the art will appreciate that gaskets and additional protective features may be provided between interconnecting components, to protect against dirt, moisture and other potentially damaging hazards. One or more of these optional features may be provided, where needed or desired, as a matter of design choice.)

The lock housing insert 5 extends from the interchangeable rear housing plate 4 of the lock housing 3. The lock housing insert 5 is configured to fit within a corresponding opening with a like configuration in a storage unit. The lock housing insert 5 may be cast with the rear plate 4 as one piece. In other embodiments, the lock housing insert 5 may be a separate piece 4*a* secured (in some other manner) to a suitable back plate piece.

A drive shaft 7 extends rearwardly from the lock housing 3 toward the interior of a storage unit (not shown). A driver 9 extends from the distal end of the drive shaft 7. The driver 9 is provided to connect with a locking system in a storage unit (which may be similar to an existing unit similar to the locking system described in Canadian Patent No. 2,388,230. Preferably, the driver 9 is interchangeable with other replacement drivers. A substitute driver may be attached to a suitably configured drive shaft segment which may also differ in configuration from the drive shaft 9 illustrated in FIG. 3.

Different drive shaft configurations may be accommodated within the interior of the lock housing 3. The drive shaft, driver and housing components may be interchangeable with other replacement components to allow the electronic lock 1 to be interchangeable with comparable mechanical locks or other electronic locks. The interchangeability of these components enhances the adaptability of the electronic lock system for simplified repairs and replacements of existing locks and in OEM manufacture.

A keypad 15 is provided as part of an electronic access control situated on the proximate face of the electronic lock 1. In this embodiment, keypad 15 includes an external protective keyboard membrane 44 and a front gasket 44*a*. The keypad 15 supports the entry of pass codes and programming commands via a keyboard circuit 42 into the memory element included in circuit board 40 by regular users and master users. Indicator light array 45 is connected to the circuit board and the power supply, to notify the operator of one or more status indicators associated with the maintenance and operation of the electronic lock. A USB port and cover 17 are provided on the side face of the lock housing 3. The USB port may be provided to facilitate recharging of the interior power storage (battery 33) used to power the electronic components of the electronic lock 1 including a battery powered rotary motor 32. In this embodiment, the USB port cover 17 is shown as a flexibly hinged attachment to a protective gasket 18 positioned between the interchangeable housing rear plate 4 and the housing frame 3*a*.

A manual knob assembly 11 surrounds a rotatable bypass (override) key core 13. The manual knob assembly 11 includes a knob grip 14 which extends outwardly from the housing front plate 3*b*. The knob grip 14 is secured to a manual knob 14*a* which partially extends inwardly, away from the front plate 3*b*. When the knob grip 14 is secured to the manual knob 14*a* (for example, in a snap fit configuration), the manual knob assembly 11 is rotatably secured to the housing front plate 3*b*. In other embodiments comprising a lock housing 3*a*, a dummy plug (not shown) may be permanently installed so that a keyed bypass feature is not available. Some customers may wish to avoid the risk of the keyed lock being picked and therefore those customers may choose to decline the keyed bypass feature.

The knob barrel 14*b* nests within knob 14*a*, and knob barrel cap 14*c* is positioned within knob barrel 14*b*, in a predetermined alignment so that the matched internal channels and abutments may selectively engage with the locking core 13 in the event that the operator chooses to operate the manual knob assembly in a manual override mode. The manual knob assembly 11 engages with a front drive gear 22 mounted about the knob barrel cap 14*c*, both of which are mounted on a fixed collar 3*c* projecting in a forward direction from the chassis 3*f* located within the housing frame 3*a*. Inner cam 14*f* is positioned rearwardly of the chassis 3*f*. The inner cam 14*f* extends through the interior channel of the collar 3*c*.

Figures 1, 10:
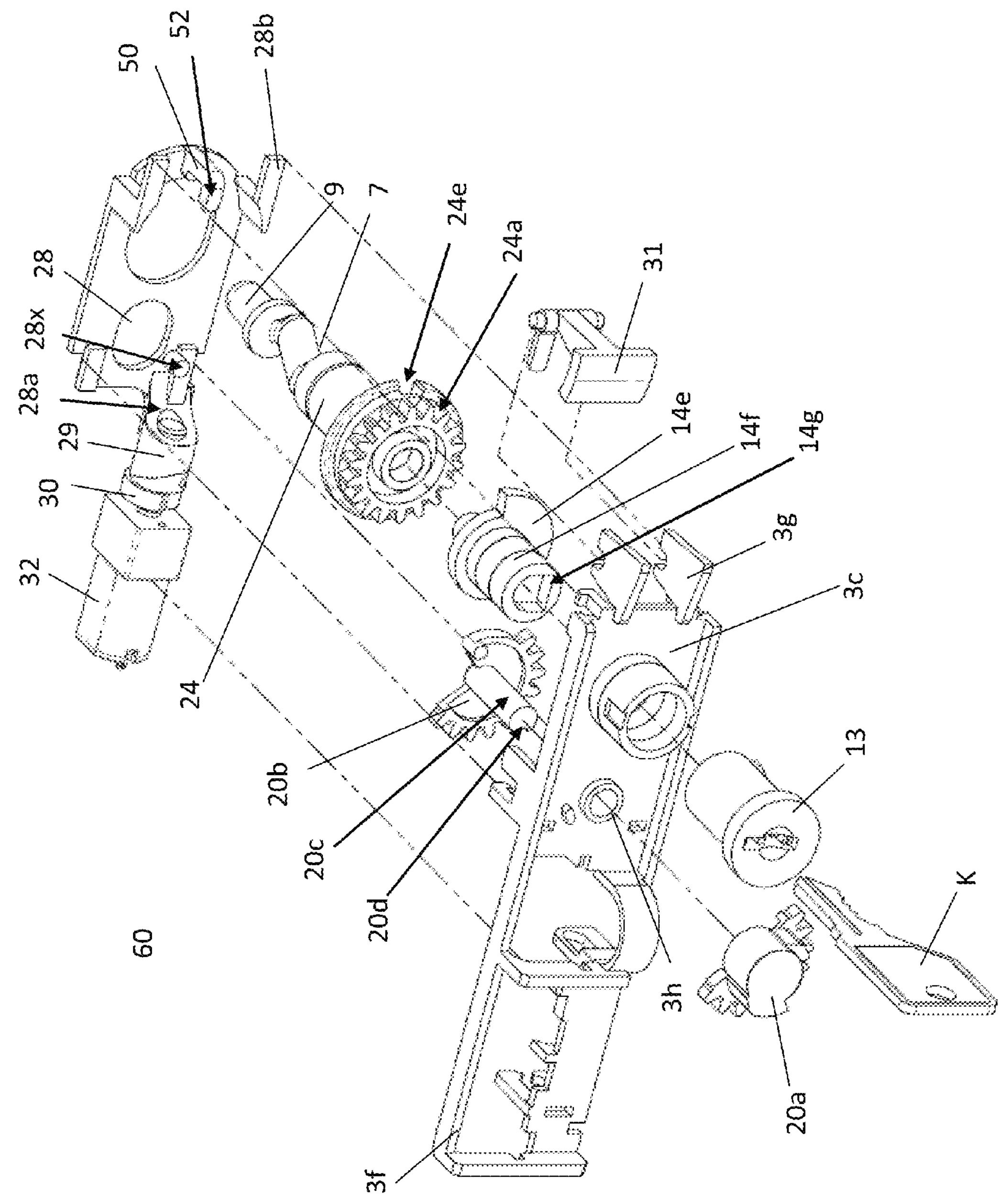
Figures 2, 10:
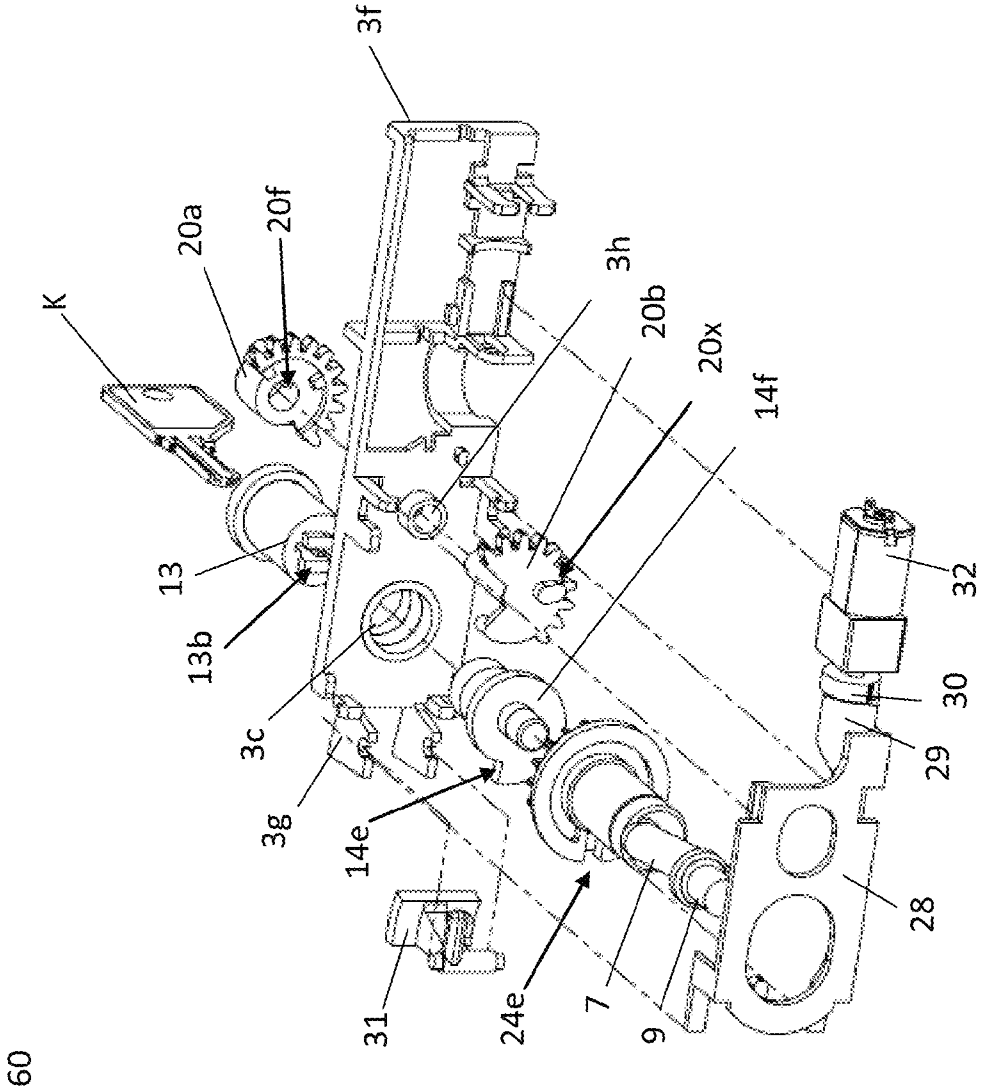
Figures 3, 10:
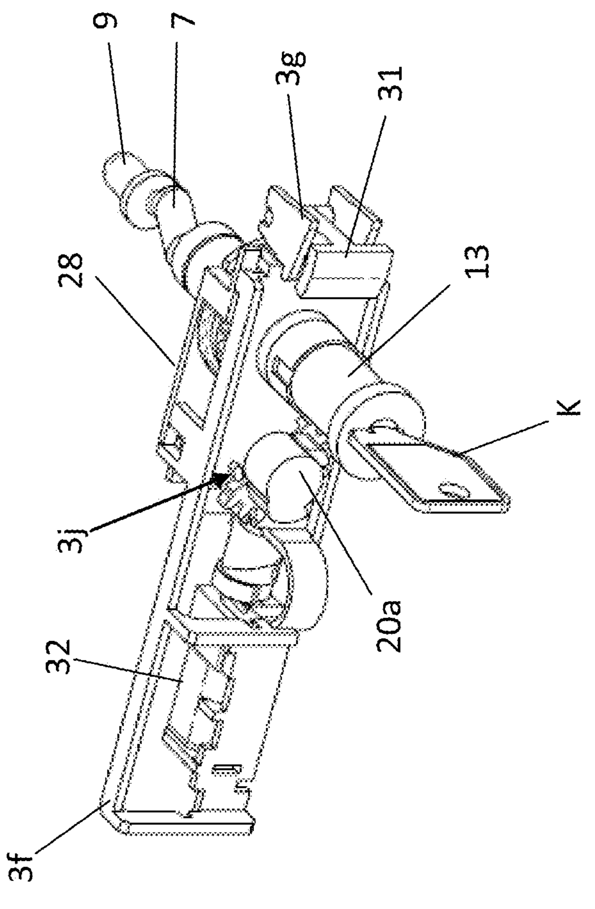

FIGS. 10-1 to 10-2 illustrate a modular chassis assembly 60. An optional chassis 3*f* is provided so that the motor 32, circuit board 40, gears and other parts may be easily assembled outside of the housing 3. An optional modular chassis assembly 60 may be utilized to obtain one or more of the following advantages, or other advantages which will be apparent to those skilled in the art:

To manage or accommodate production tolerances and to improve the alignment of parts and micro switches during assembly;

To permit convenient testing of modular assemblies within the lock assembly, and preferably, the circuit board, battery and motor, prior to installation into the housing. This also allows for convenient replacement of faulty parts prior to final assembly.

To simplify assembly and installation steps so that any parts designated for association with the modular chassis assembly 60 may be snapped into (or otherwise connected to) the chassis 3*f*, for subsequent installation into the housing 3.

When the electronic lock 1 is in a locked state, the manual knob assembly 11 and the drive shaft 7 are not engaged and will not permit operation of the driver 9. In the disengaged state, the manual knob 14*a* spins freely.

Figures 1, 15:
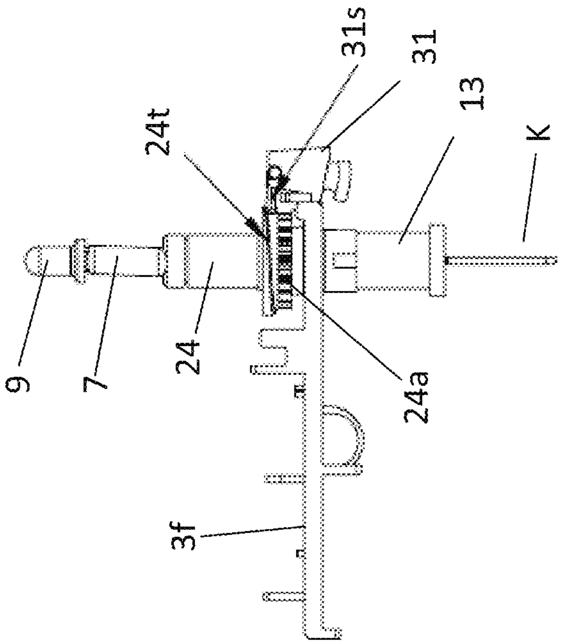
Figures 2, 15:
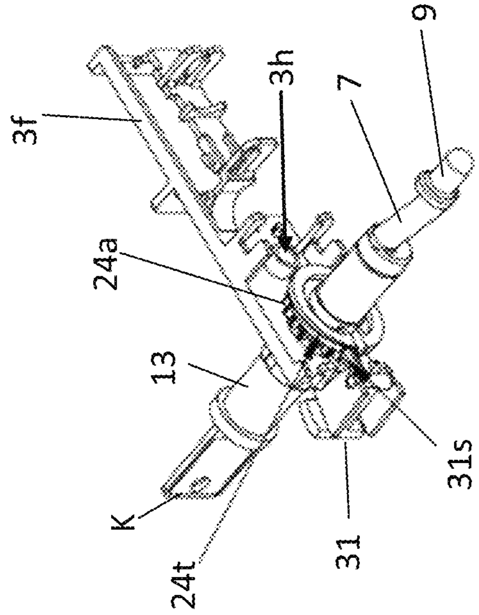
Figure 16:
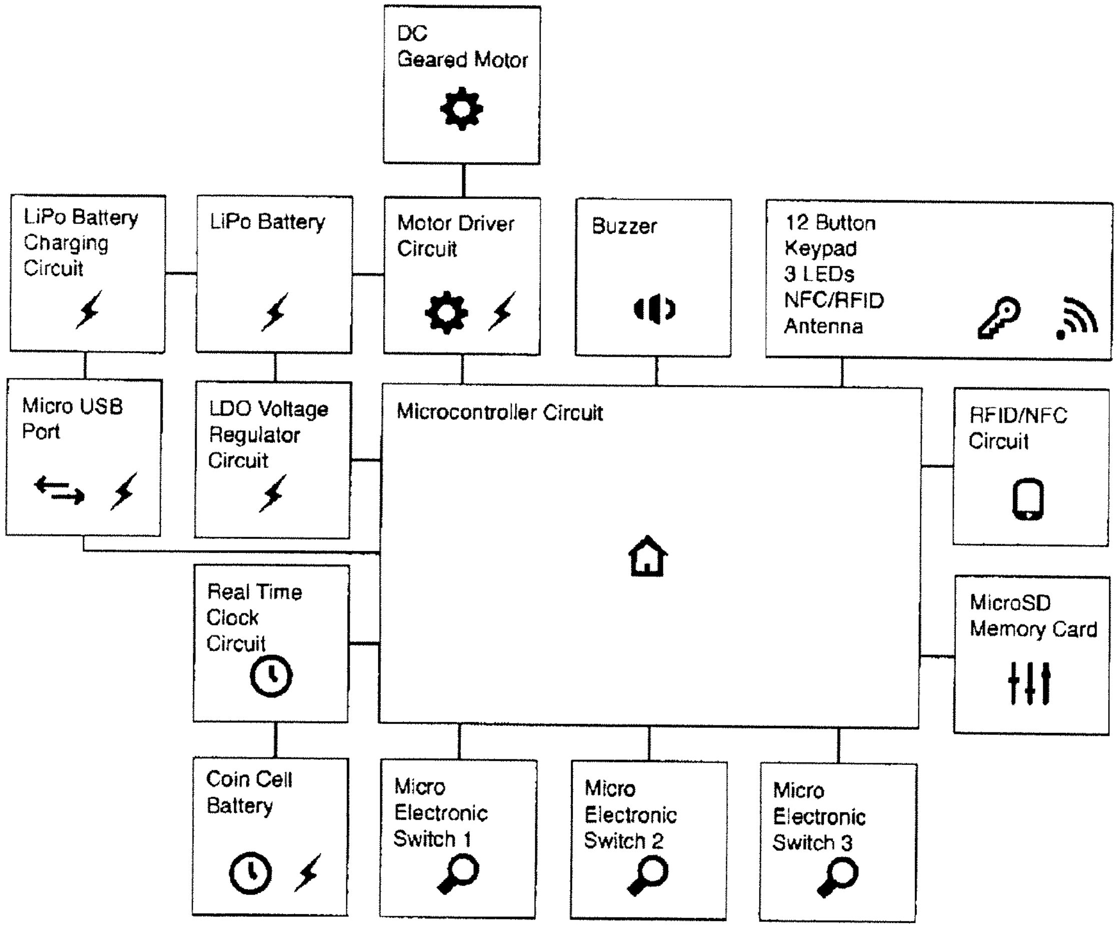
FIG. 16 is a schematic representation of a sample circuit board of a preferred embodiment of the present invention.

Once the appropriate passcode has been successfully entered and accepted by the software, the motor 32 begins to rotate. Ramped collar cam 30 which is mounted on the motor shaft also rotates. This collar cam 30 interacts with the ramped follower surface 29*a* on the first slider cam 29 so that as the collar cam 30 rotates, the slider 28 is urged away from the collar cam 30. This linear movement of the slider 28 displaces the locking dog 50 in the second slider cam 28*b*, to disengage locking dog 50 from recess 24*e* in rear drive gear 24*a*, to unlock and permit manual rotation of the drive shaft 7. The slider lobe 28*x* engages gear lobe 20*x*, when the slider 28 is displaced, to rotate the front and rear gear segments 20*a*, 20*b*, so that the gear segments 20*a*, 20*b* are aligned for engagement with the front drive gear 22 and rear drive gear 24*a*. When the knob 14 is turned, the gears 20*a*, 20*b*, 22, and 24*a* are meshed and the drive shaft 7 also turns. As shown in FIGS. 15-1 and 15-2, the ramped surface 24*t* on the rear drive gear 24*a*, engages indicator tab 31*s* (configured to act as a cam follower, along ramped surface 24*t*), to pivotally displace the indicator 31, to show that the lock is in the open position, or in the closed position, as the case may be.

The gear segment assembly 20 includes a front gear segment 20*a* located forward of the chassis 3*f* and a rear gear segment 20*b* located rearward of the chassis 3*f*. A gear segment sleeve 20*c* extends through an aperture 3*h* in chassis 3*f* to connect front gear segment 20*a* to rear gear segment 20*b*. Torsion spring 27*a* urges the gear segment assembly 20 in a preferred direction, preferably to hold the gear segment assembly 20, in a starting position, abutting against rest 3*j*, when the gear assembly 20 is disengaged from the corresponding gears of the front drive assembly 14*d* and the rear drive gear assembly 24 when the electronic lock is in the locked position. In this embodiment the front drive assembly 14*d* includes front drive gear, and parts 14, 14*a*, 14*b* and 14*c*. The rear drive gear assembly includes rear drive gear segment 24*a*.

Front gear segment 20*a* includes a first cam segment 21*a* and a second cam segment 21*b*. Cam segments 21*a* and 21*b* interact with the drive gear assembly, during rotation of the drive gear assembly, to activate control switches which interact with the motor, during the opening and closing steps of the electronic lock.

When the manual knob assembly 11 and the gear assembly 20 are operationally engaged and the manual knob assembly 11 is turned, the drive shaft 7 also turns. The user turns the manual knob assembly 11 through 180 degrees to open a matched locking assembly (not shown) within a storage unit (not shown). This manual action provides the power to lift locking bars, rotate cams and other locking features without electrical power. This optional power saving feature allows an operator to apply manual power to perform these steps thereby reducing the power draw from the battery 33.

The electronic lock 1 supports an optional manual override key K. The override key K bypasses the keypad 15 and allows the manual knob assembly 11 to be turned in operational engagement with the drive shaft assembly after the override key has been turned.

When tumblers (not shown) in the locking core 13 are key activated, they engage with the internal channels and abutments of the manual knob assembly 11 to enable the bypass (override) option, allowing the operator to operationally engage the drive shaft assembly and rotate it upon rotation of the locking core 13 and the manual knob assembly 11.

With reference to FIGS. 10 to 14, the lock core 13 has a horseshoe shaped extension 13*b* on its rear face which latches, in a slide-fit, with a corresponding, horseshoe shaped slot 14*g* on inner cam 14*f*. When the key K is inserted into the lock core 13, and the key K and lock core 13 are turned, the inner cam 14*f* also turns. The inner cam surface 14*e* acts against the cam follower 52 on the slider 28. This manual action moves the slider 28 in the same direction as the motor 32 would move the slider 28, if the motor 32 were used to operate the drive shaft 7 rather than the manual bypass. This movement of the slider 28 displaces the locking dog 50 on the second slider cam 28*b*, to disengage locking dog 50 from locking recess 24*e*, thereby unlocking the rear drive gear segment 24*a* and the drive shaft 7 so that the drive shaft 7 and the driver 9 may be rotated. The slider lobe 28*x* engages gear lobe 20*x*, when the slider is displaced, to rotate the front and rear gear segments 20*a*, 20*b*, so that the gear segments 20*a*, 20*b* are aligned for engagement with the front drive gear 22 and rear drive gear 24*a*. When the knob 14 is turned, the gears 20*a*, 20*b*, 22, and 24*a* are meshed and the drive shaft 7 also turns. As shown in FIGS. 15-1 and 15-2, the ramped surface 24*t* on the rear drive gear 24*a*, engages indicator tab 31*s* (configured to act as a cam follower, along ramped surface 24*t*), to pivotally displace the indicator 31, to show that the lock is in the open position, or in the closed position, as the case may be. The indicator tab 31*s* is kept in contact with the ramped surface 24*t* by a torsional spring 27 (shown in FIG. 5).

Figures 1, 11:
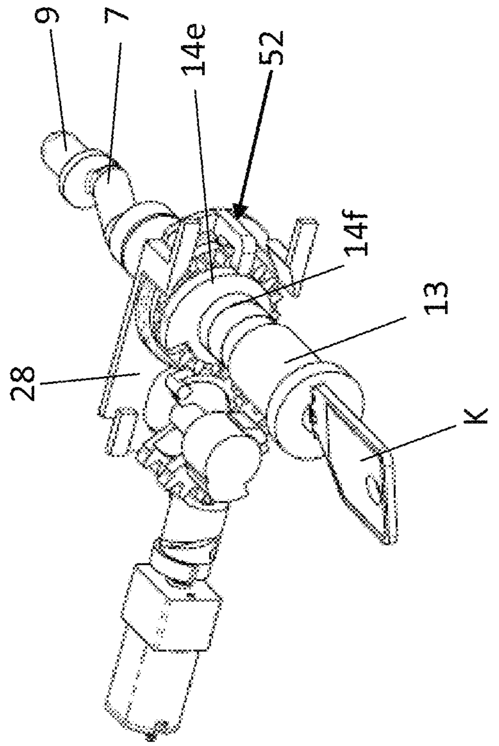
Figures 2, 11:
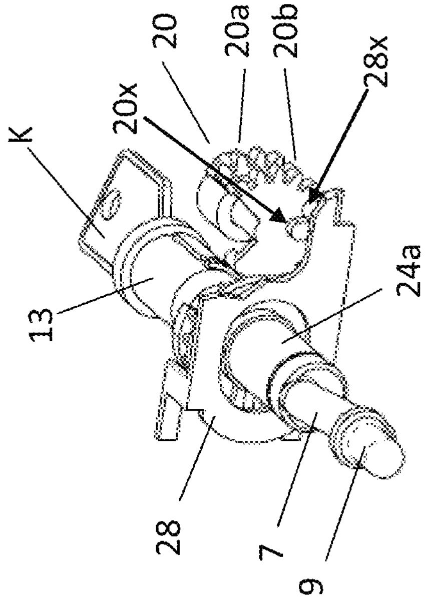
Figures 1, 12:
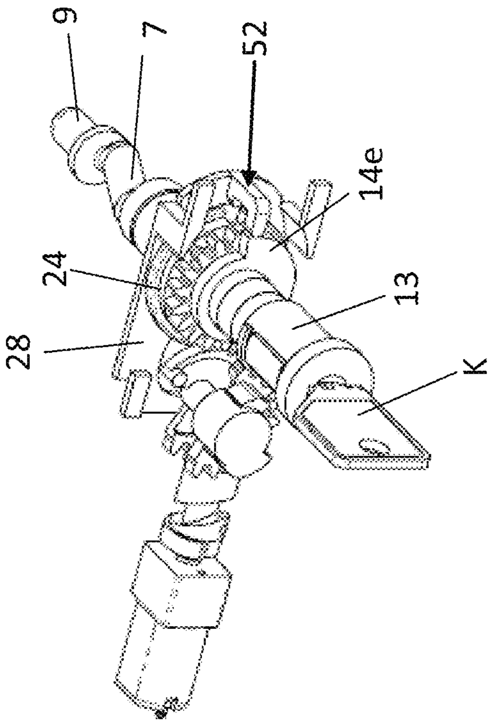
Figures 2, 12:
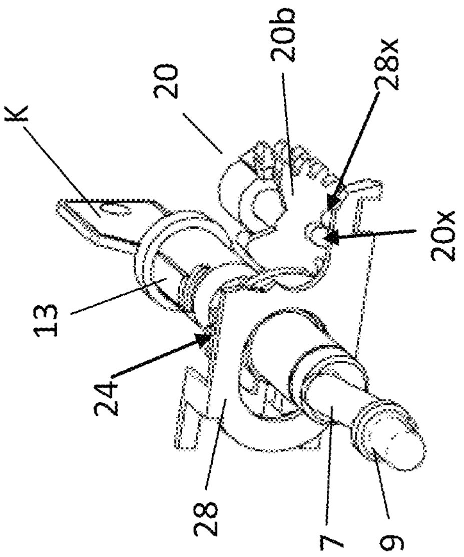
Figures 1, 13:
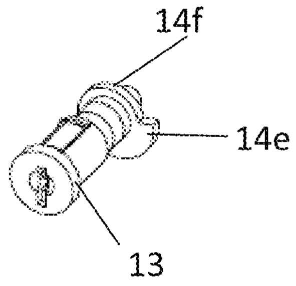
Figures 2, 13:
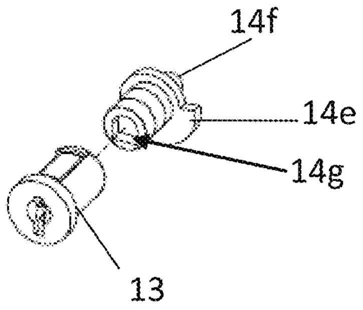
Figures 3, 13:
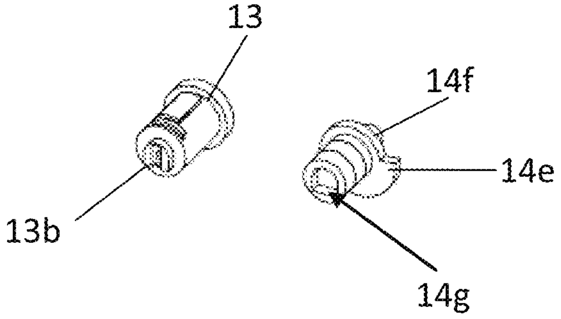
Figure 14:
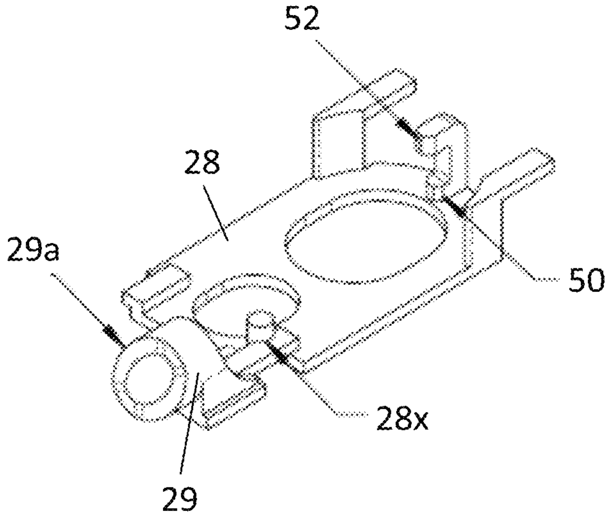
FIG. 14 is a perspective detail view of the slider cam included in the modular chassis assembly illustrated in FIGS. 11-1 to 11-3.

FIGS. 11-1 and 11-2 show partial sectional views of select components of the manual override system, as the key K is partially rotated. As the key K is rotated (along with the lock core 13), the inner cam 14*f* pushes the slider 28 outwardly from the rear drive gear, to disengage the dog 50 from recess 24*e*. At the same time, the slider lobe 28*x* engages the gear lobe 20*x*, to initiate rotation of the gear segments 20*a*, 20*b*. As the key K is rotated 180 degrees, as shown in FIGS. 12-1 and 12-2, the inner cam 14*f* continues to push the slider 28 outwardly away, to engage gear segments 20*a*, 20*b*, with gears 22, 24*a*.

An index spring 12 acts as a detent so the user can feel discrete clicks as the manual knob assembly 11 is rotated to advance through the operational steps of locking and unlocking.

In this embodiment, the indicator 31 is used to show different colours in the window lens 12*a* corresponding to the rotational position of the manual knob assembly 11 and whether the driver 9 has opened or closed the locking assembly. Torsion spring 27 urges the indicator 31 in a preferred direction to indicate the status of the electronic lock 1. These different colours provide the user with a visual cue showing the status of the electronic lock and its corresponding affect on the locking assembly in the storage unit: (i) fully opened, (ii) fully closed or (iii) manual knob assembly 11 is partially turned.

The electronic lock is readily adapted for use with various locking systems and storage units. A variety of interchangeable drive shafts and drivers may be provided with the electronic lock. The drive shafts and drivers are designed to fit with pre-existing locking components or standard OEM parts used by furniture manufacturers and the like. In addition, interchangeable lock housings of different configurations may be provided. For example, with regard to the example of the standard "Double D" lock housing, an opening of the same size and corresponding configuration is provided by furniture manufacturers in their furniture to accept a standard mechanical lock with a Double D mechanical lock housing. The electronic lock is easily adapted to be surface mounted on the furniture so that the housing insert 4*a* may be inserted as a replacement into a corresponding opening in an existing storage unit, including office furniture, fitted with a standard mechanical lock with a Double D housing.

The electronic lock is easily adapted to be installed into an existing central locking system of a storage unit in exactly the same manner as an existing mechanical lock. In a preferred embodiment, the back plate of the lock housing assembly is first mounted within the gable of the cabinet structure using a hex nut, spring clip or other means suitable to secure the housing back plate to the structure. For convenience, a template may be provided to locate a single drill hole for a mounting screw (not shown) on the cabinet structure to match a threaded opening or other fastening feature on the lock. The hole may be drilled in the cabinet (or other structure) and the screw may be threaded through the drilled hole and into the electronic lock housing to ensure that the housing does not rotate or move relative to the structure after installation. Provided that the appropriate housing insert, drive shaft and driver configurations have been selected, the installer should be able to install the electronic lock without other tooling changes.

The central locking system is installed in the same manner and configuration as with a mechanical lock.

Figure 6:
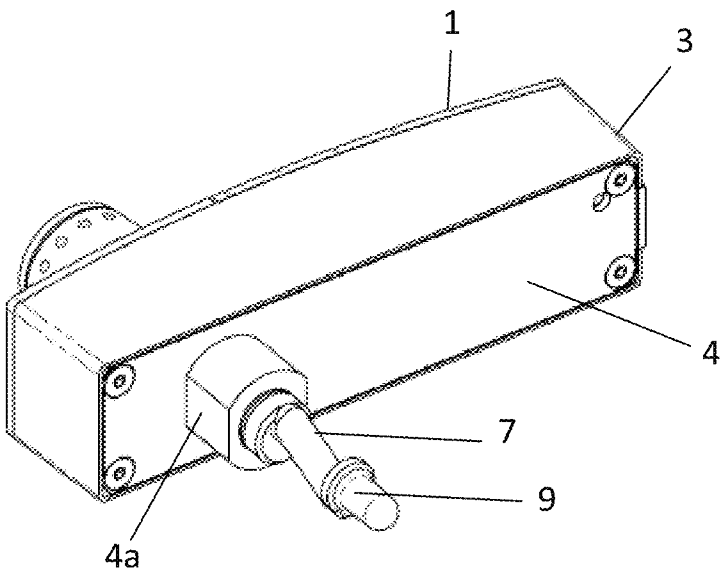
Figure 1:
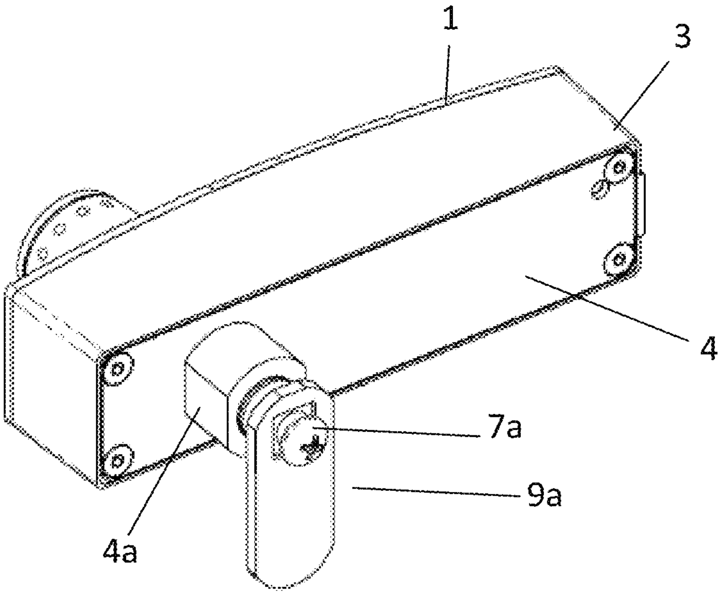
Figures 2, 6:
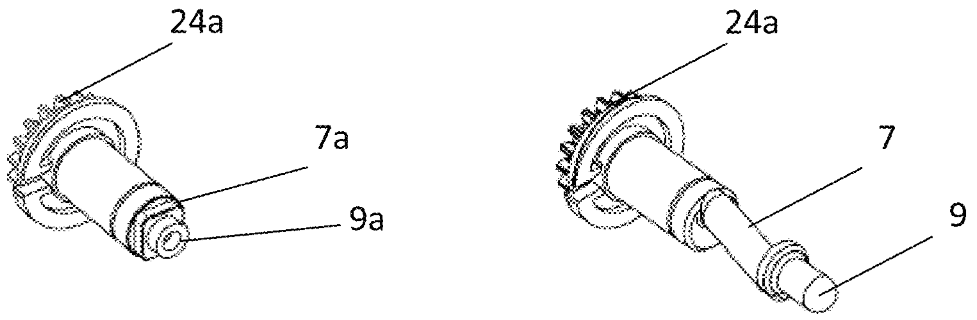

In different embodiments, the lock drive shaft and or driver may be replaced with a plurality of shapes and sizes such as square, horseshoe or other configurations. FIG. 6-1 and FIG. 6-2 illustrate two examples of two drive shafts 7,7*a* fitted with driver configurations 9,9*a*. A variety of locking cam configurations may be affixed to, or incorporated into, the end of a driver to suit many specific locking requirements of office furniture manufacturers and other manufacturers. A locking cam may be affixed to a driver or drive shaft with a hex nut or other suitable means. For example, driver cam 9*b* is shown as one embodiment of a removable cam feature. In some instances, it may also be convenient to provide a drive shaft segment, driver and cam element which may be manufactured as a single work piece.

Opening the Lock

Figures 1, 7:
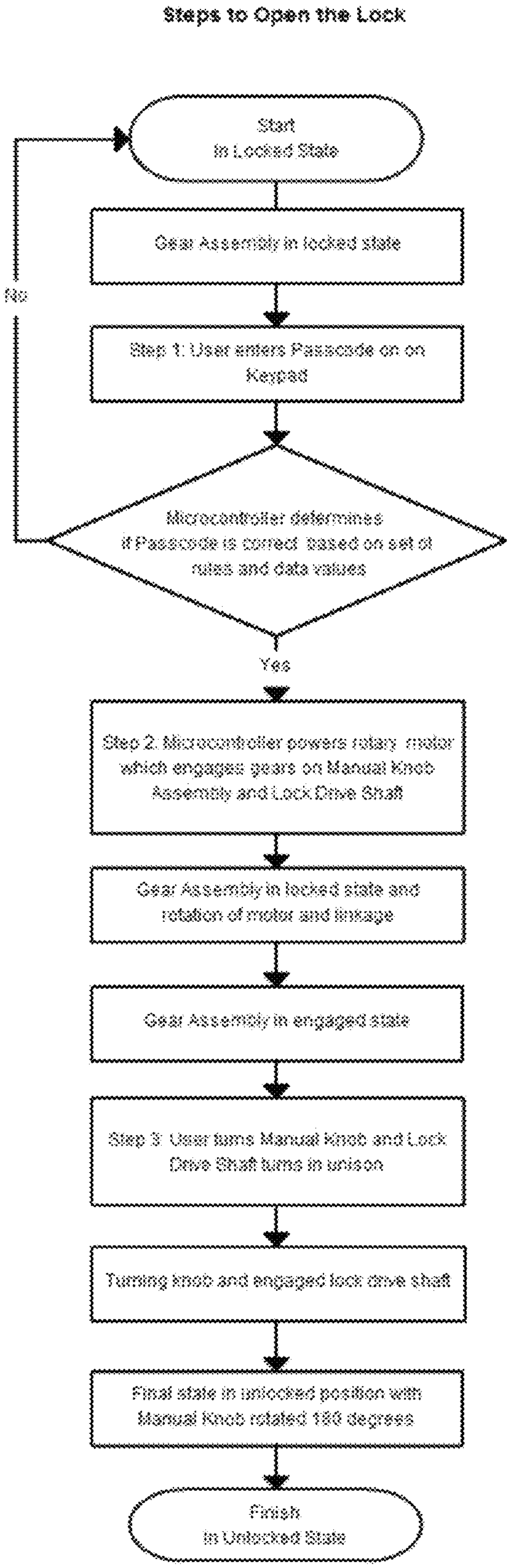
Figures 2, 7:
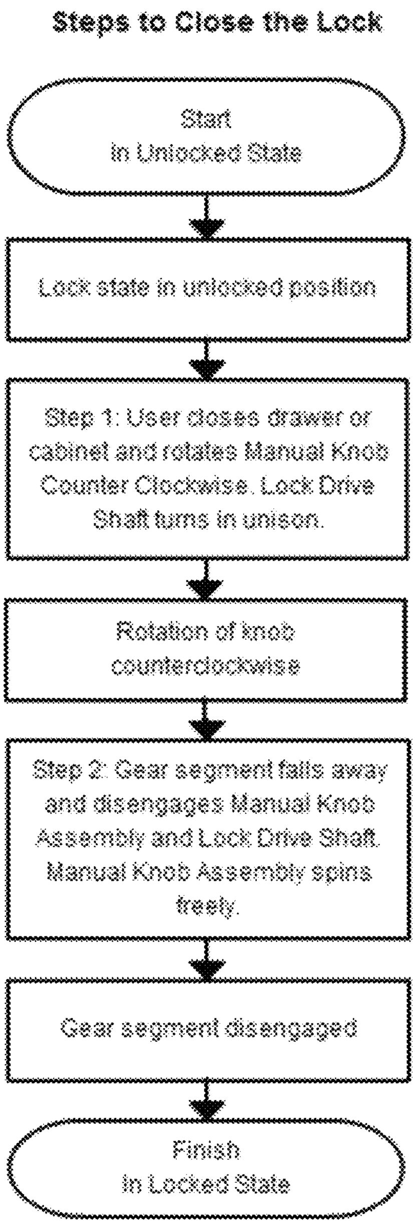

FIG. 7-1 shows an example of the logical steps taken to open the electronic lock.

Figures 1, 8:
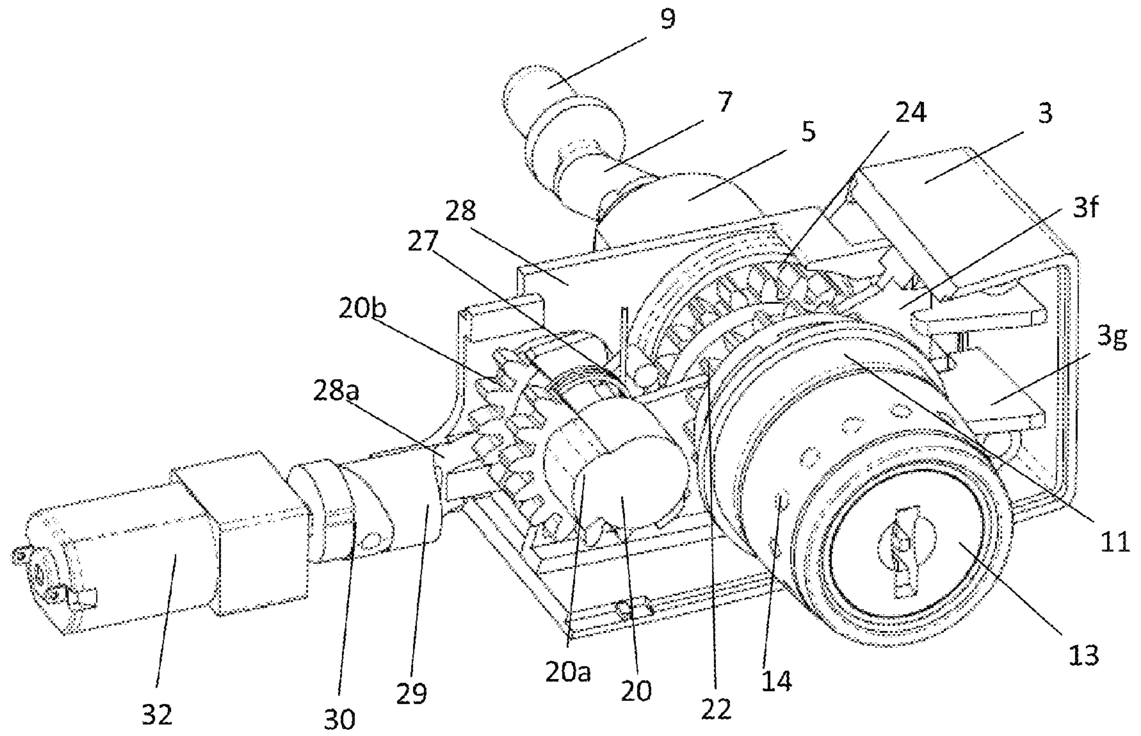
Figures 2, 8:
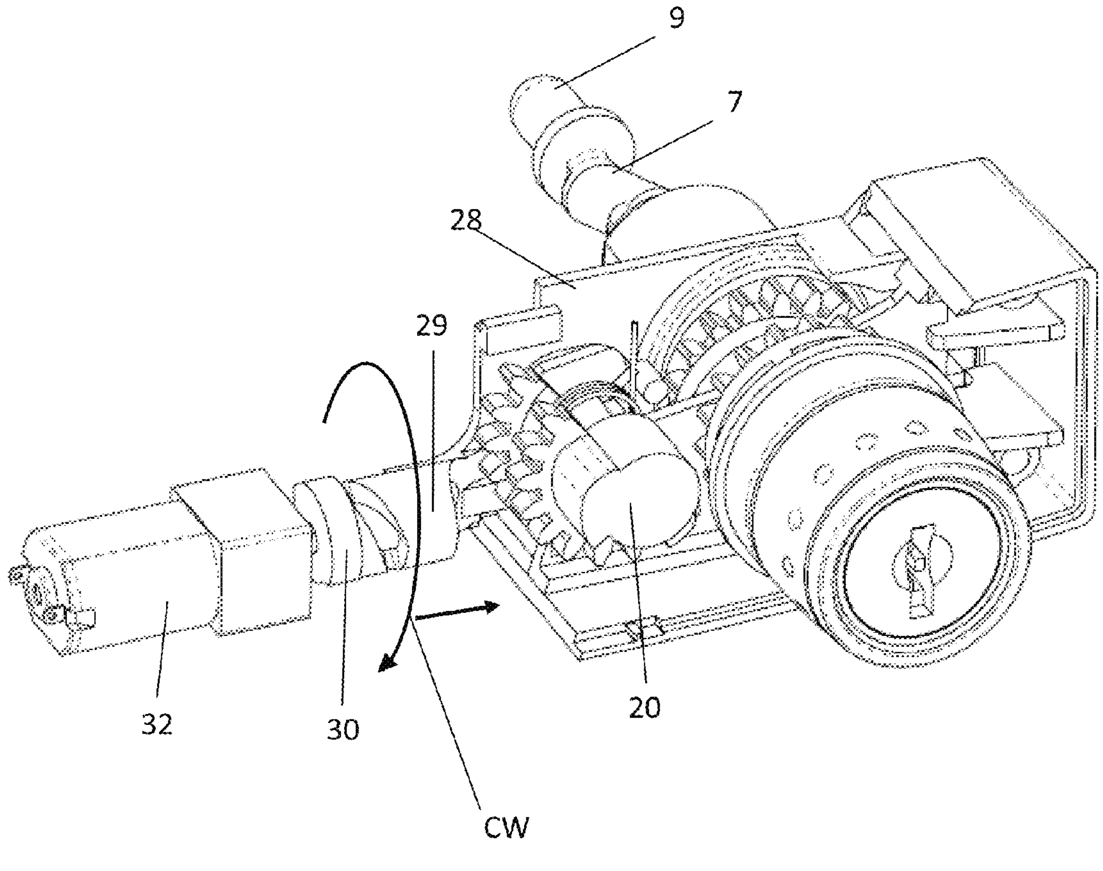
Figures 3, 8:
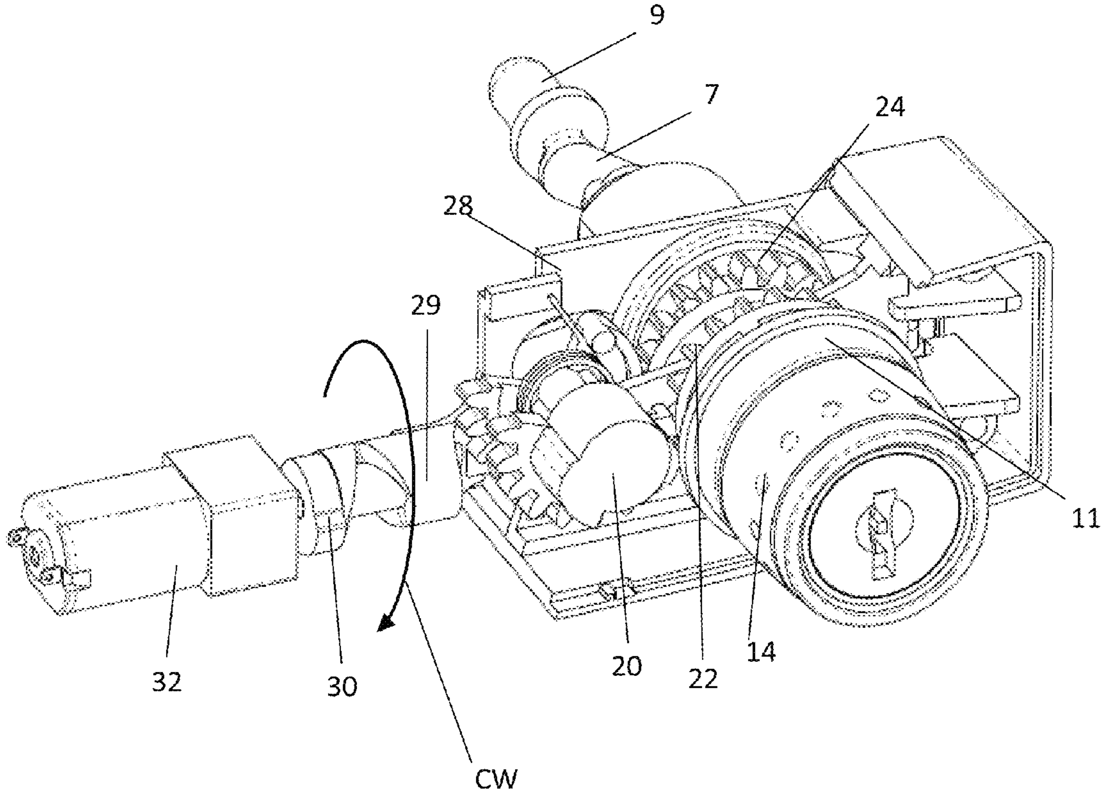
Figures 4, 8:
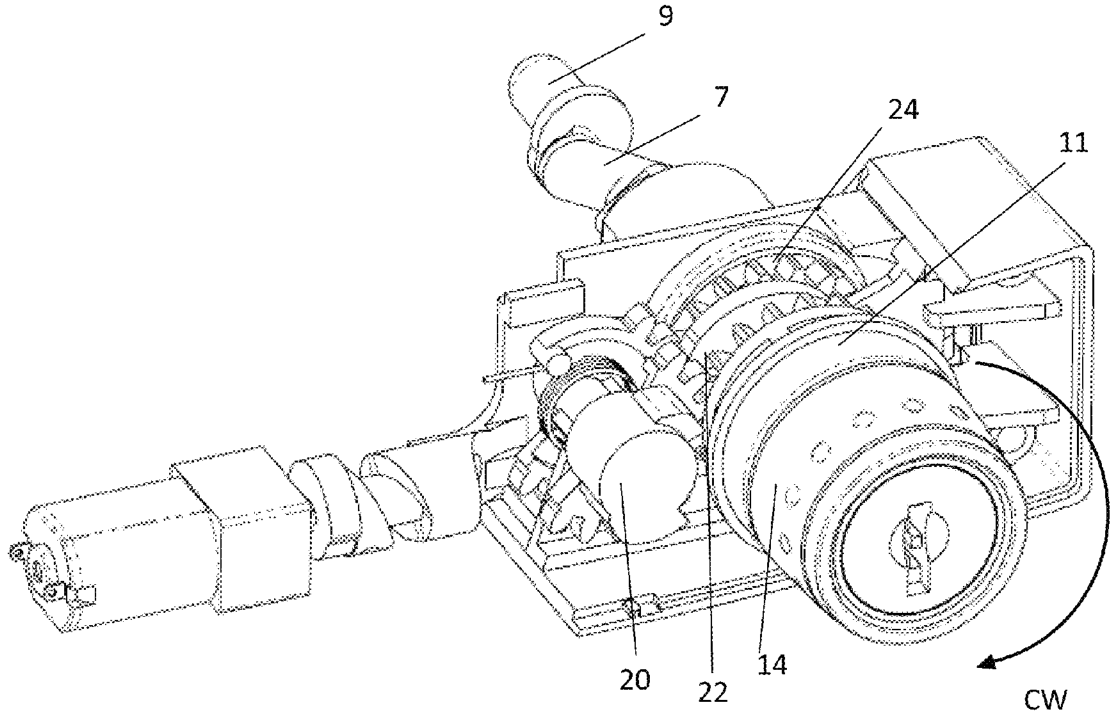
Figures 5, 8:
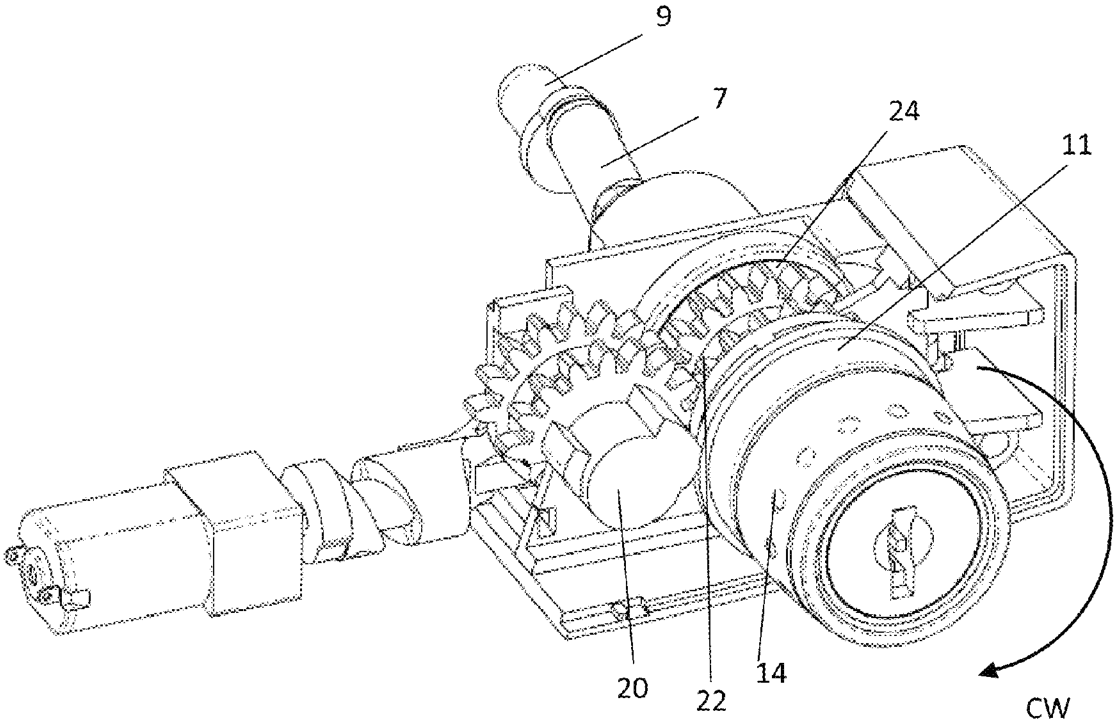

The electronic lock 1 is initially in the locked state as shown in FIG. 8-1. The torsion spring 27*a* biases the gear segment assembly 20 away from the rear drive gear assembly 24 associated with the drive shaft and away from the front drive gear 22 of the front drive assembly 14*d* associated with the manual knob assembly 11. In this state, the manual knob spins freely and does not engage with the drive shaft. The slider 28 also retains the drive shaft in a fixed position so that it cannot rotate when the lock is in the locked position.

Step 1

The user enters a pass code on the keypad which is validated by the microcontroller against the data stored in the database. The data includes a pass code and other pre selected information, for example, the time of day. If the pass code is valid, then power is applied to the motor to engage the gear segment assembly to engage the manual knob assembly with the drive shaft.

Step 2

FIG. 8-2 shows the assembly as the motor 32 begins to rotate. As power is applied to the motor 32, the motor 32 and collar cam 30 rotate in a clockwise direction. The collar cam moves the slider 28 which engages the gear segment assembly 20 with drive gears 22, 24*a* (to connect drive assemblies 14*d*, 24) and unlocks the drive shaft to allow manual rotation.

FIG. 8-3 shows the assembly with the various gears fully engaged and the manual knob assembly is ready for manual rotation.

Step 3

Once the gear segment assembly 20 is engaged with both drive gears 22, 24*a* (e.g., the gear segments from the rear drive gear assembly 24 and the front drive assembly 14*d* associated with the manual knob assembly 11), the user can now turn the manual knob assembly 11 to open the locking assembly (for example, a locking bar assembly) in the storage unit. FIG. 8-4 shows the electronic lock assembly as the user commences rotation of the manual knob assembly 11.

FIG. 8-5 shows the lock in the fully opened position after the manual knob assembly has been turned 180°.

Closing the Lock

FIG. 7-2 shows the steps to close and lock the electronic lock.

FIG. 8-5 shows the lock in the fully opened position.

Step 1

Figure 9:
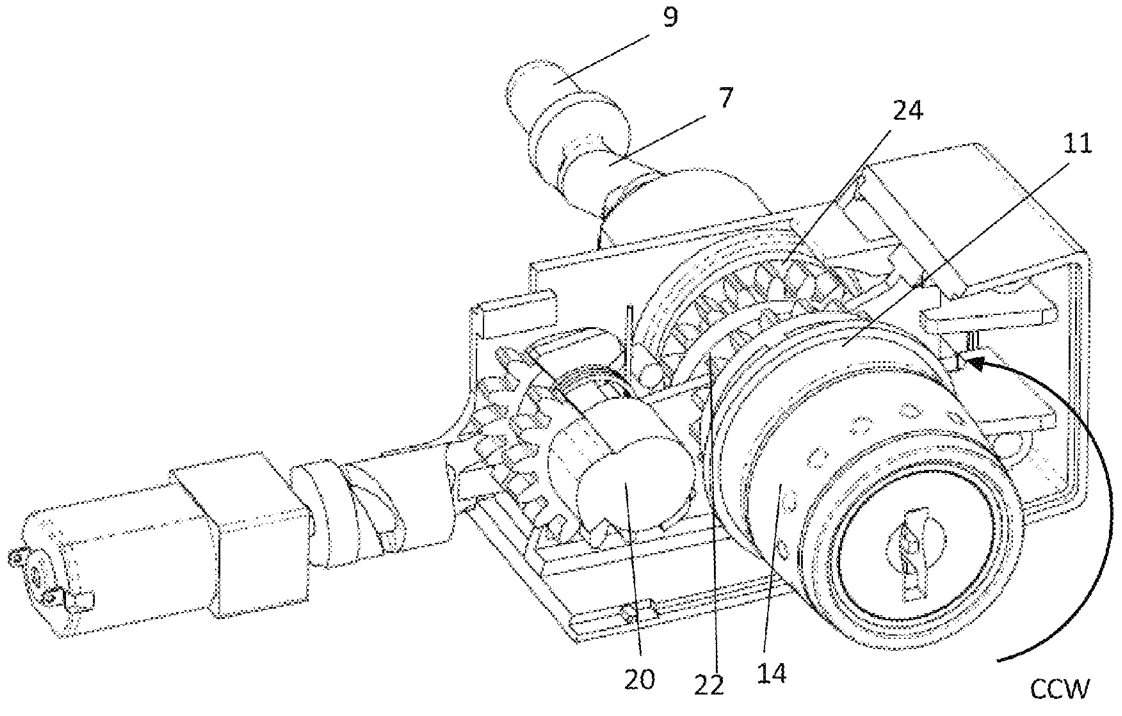
FIG. 9 shows a partial interior view of the illustrated embodiment of the Electronic Lock as the user begins the locking operation.

The user then closes a drawer or door (not shown) on the storage unit (for example, in a furniture cabinet) and turns the manual knob assembly 11 through 180° in a counter clockwise direction. This action is shown in FIG. 9.

Step 2

As the user continues to turn the manual knob assembly 11 fully through 180°, the gear segment assembly 20 disengages and falls away and is biased away by the torsion spring 27*a*. In Step 2, the electronic lock is in the fully locked position shown in FIG. 8-1.

FIGS. 4-2, 4-3 and 16 show a preferred embodiment of the microcontroller circuit components, including: microcontroller 78, DC geared motor 32, keypad 15 with LED lights, LiPo battery 33, USB port 17, microSD memory card 80, a battery charging circuit and a voltage regulator 87, real-time clock 72, coin cell battery 74, three micro switches 82, 84, 86. Optionally the circuit components also include an RFID/NFC antenna within the keypad 15 and an RFID/NFC Circuit.

FIGS. 4-2 and 4-3 show the placement of the microcontroller circuit components within the electronic lock housing frame 3*a*. The placement of the micro switches 82, 84, 86 is also shown in these figures.

Figures 1, 19:
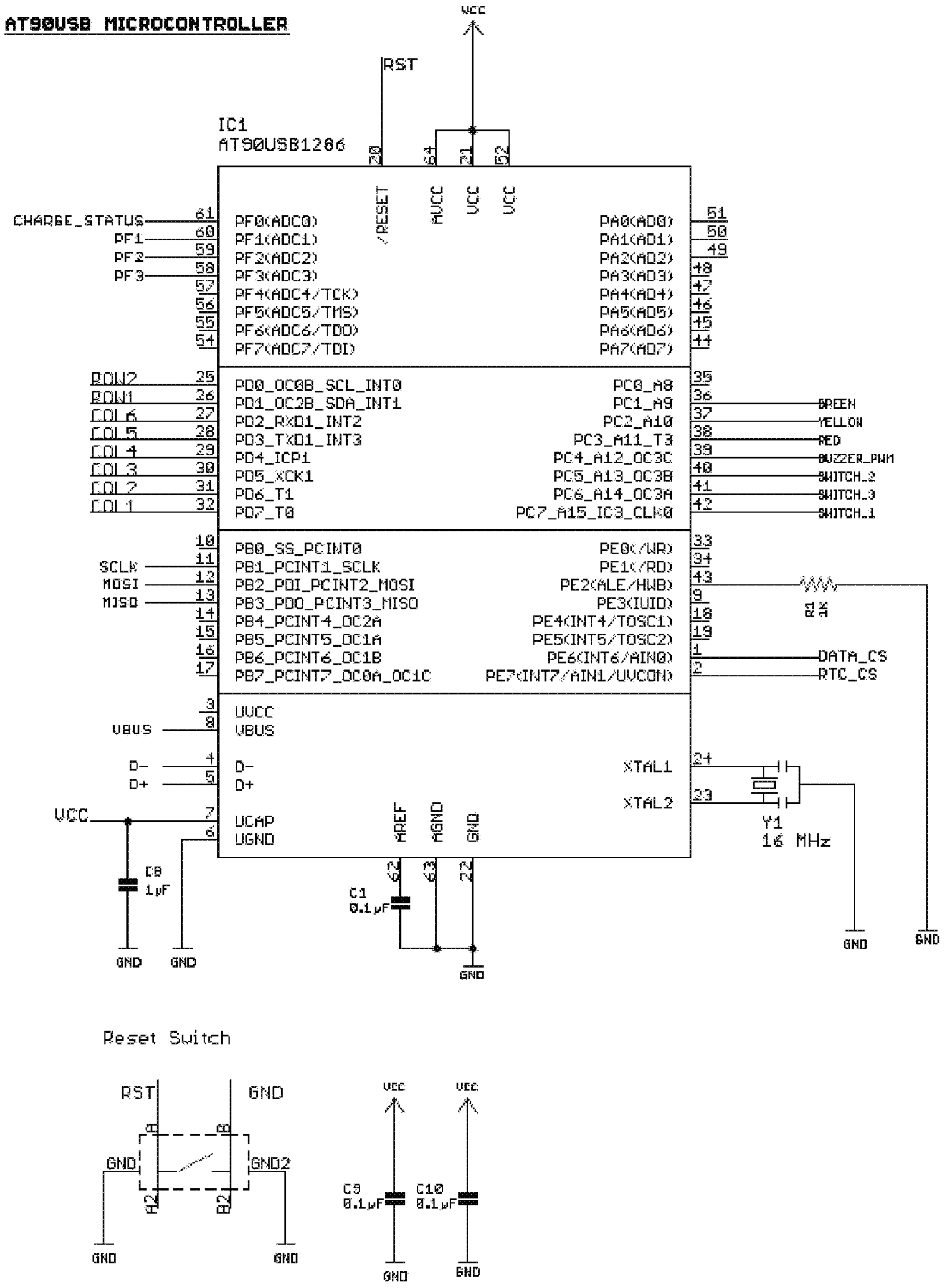
Figures 2, 19:
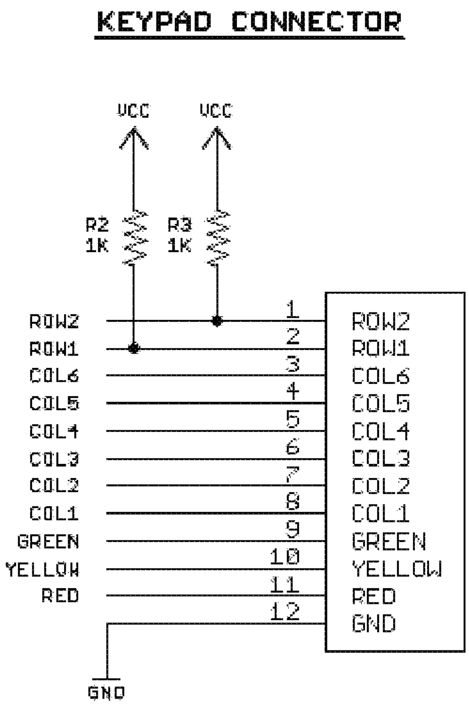
Figures 3, 19:
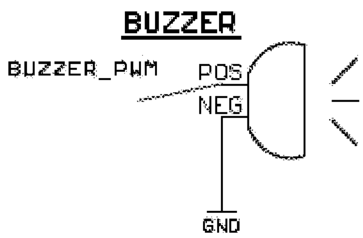
Figures 4, 19:
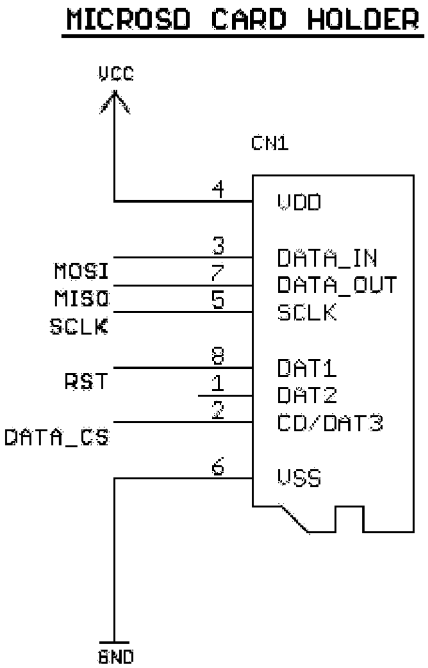
Figures 5, 19:
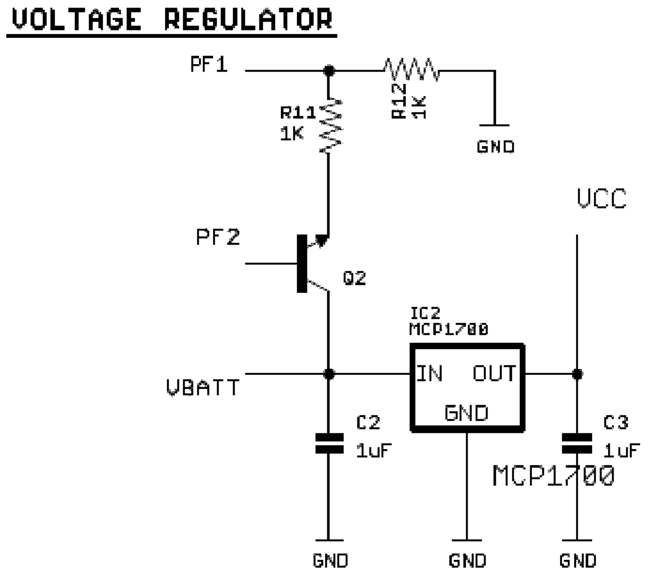
Figures 6, 19:
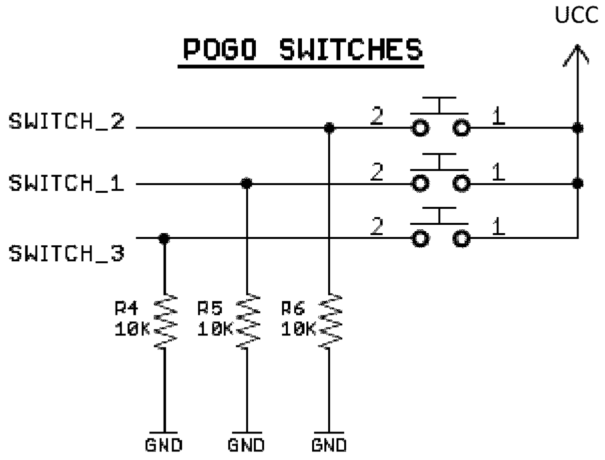
Figures 7, 19:
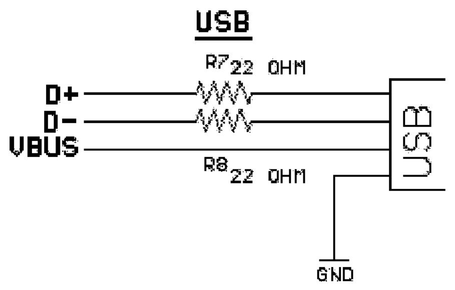
Figures 8, 19:
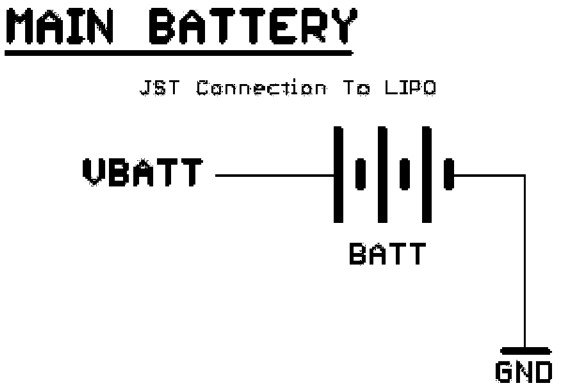
Figures 9, 19:
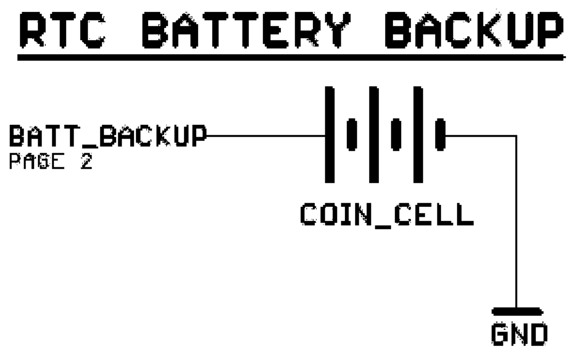
Figures 10, 19:
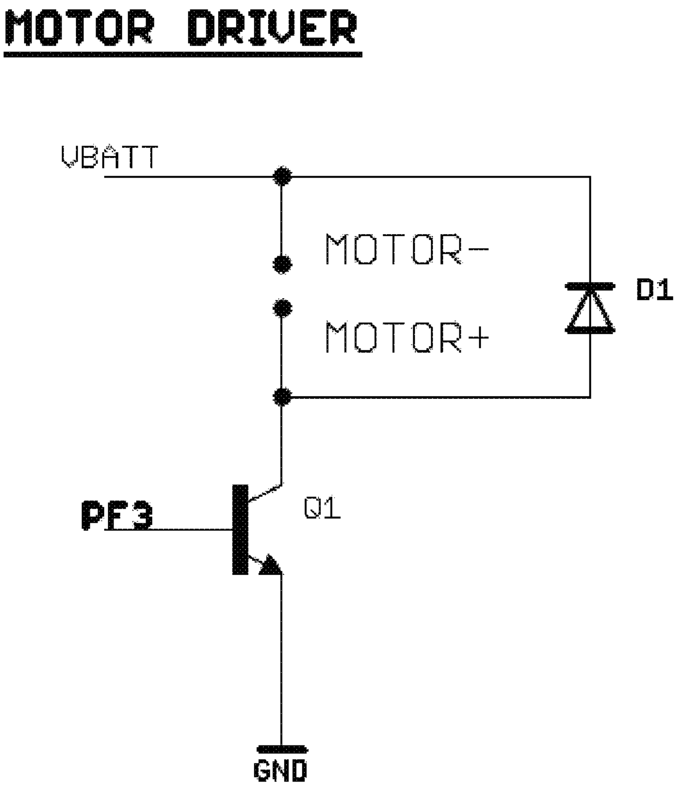
Figures 11, 19:
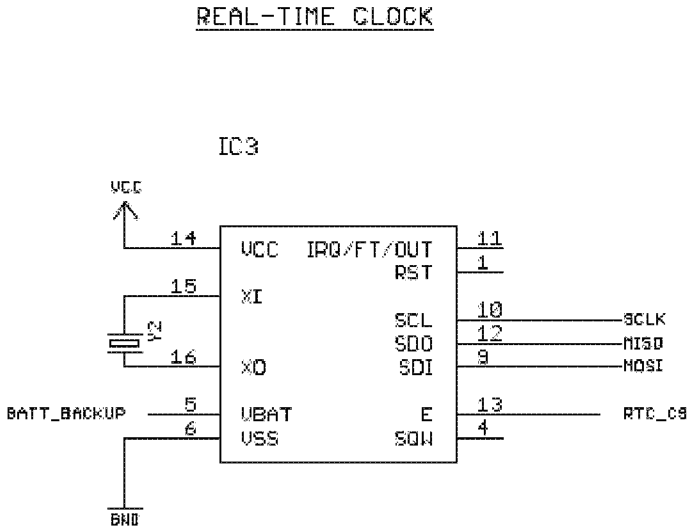
Figures 12, 19:
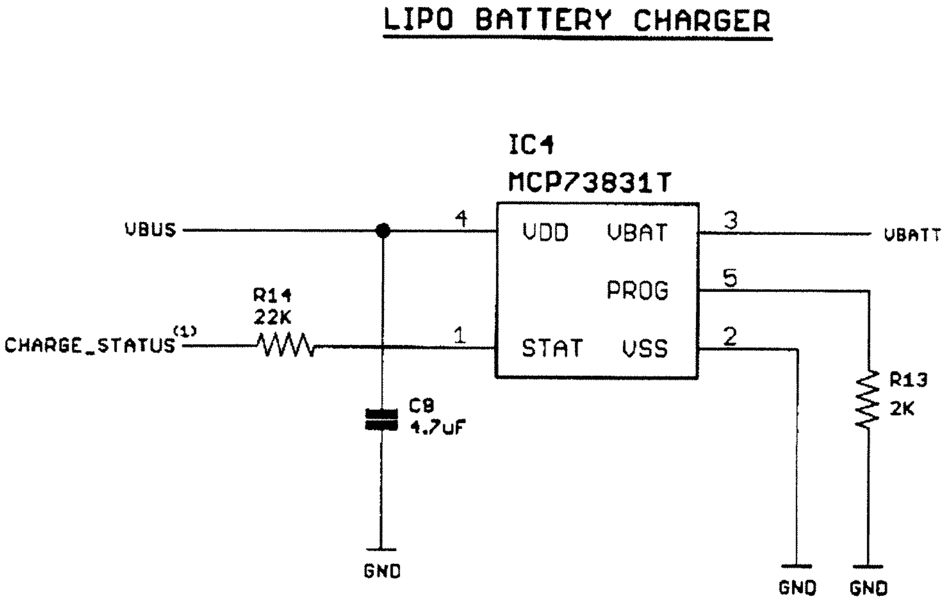

FIGS. 19-1 to 19-12 illustrate a suitable set of microcontroller schematics for an AT90USB microcontroller 78, keypad connection, buzzer 76, microSD memory card 80, voltage regulator (included in part 87), three micro switches 82, 84, 86, USB port 17, a main LIPO battery 33, a real-time clock battery 74, motor driver, real-time clock 72 and LiPo battery charger (included in part 87) for use in an electronic lock of the present invention.

Preferably, motor 32 is a relatively low cost, DC geared, small rotary motor used to rotate the collar cam 30 which in turn engages the gear segment assembly 20 and moves the slider 28 as described in more detail above. A DC geared rotary motor may be selected for one or more of the following reasons: (i) a rotary motor design may save space over several other motors alternatives; (ii) a geared motor may provide relatively high torque from a smaller motor; (iii) often, it will maintain its state without additional power; (iv) it may operate within a range of 3.0 V (or lower) to 5 Volts which means that power does not have to be regulated when used with a LiPo Battery; and (v) it may be configured for relatively low power consumption resulting from a relatively low power requirement and a relatively short duration of usage per operational cycle.

Preferably, the gear reduction is about 100:1 but other reductions such as 50:1 and 150:1 may also be used. A preferred DC geared rotary motor will allow voltage input over a 3-6 Volt range which would allow the motor to be attached directly to the LiPo battery, thus bypassing or avoiding a need for the voltage regulator.

As described in more detail above, each 180° turn with the shaft attached to the motor toggles the advanced/retracted position of the slider and gear segment assembly, thereby allowing the user to turn the knob barrel and open the lock.

Power from the LiPo battery 33 is applied to the motor 32 to accomplish each 180° turn of the shaft. In the preferred embodiment, each turn of the shaft (which is accomplished by human power) requires power to be applied for only approximately 0.25 seconds. For each full use cycle of the lock (corresponding to opening and closing the lock), the motor shaft will have accomplished two 180° turns over approx. 0.25 sec intervals each, totaling 360° and approximately 0.5 sec of power being applied from the LiPo battery. For each full open and close cycle of the lock, power usage will total approx. 0.004 mAh, or 0.00057% of the usable power capacity of the LiPo battery.

Table 1 contains a list of preferred parts for the circuit board of the preferred embodiment.

TABLE 1

Preferred Parts List for Circuit Board of the Preferred Electronic Lock

| Qty | Reference | Value | Source | Part # |
|---|---|---|---|---|
| 5 | R1, R2, R3, R11, R12 | 1K Ω | Digi-Key | P1.0KJCT-ND |
| 3 | R4, R5, R6 | 10K Ω | Digi-Key | P10KJCT-ND |
| 2 | R7, R8 | 22 Ω | Digi-Key | P22JCT-ND |
| 1 | R9 | 22K Ω | Digi-Key | P22KJCT-ND |
| 1 | R10 | 2K Ω | Digi-Key | P2.0KJTR-ND |
| 3 | C1, C9, C10 | 0.1 μF | Digi-Key | 445-4964-1-ND |
| 3 | C2, C3, C8 | 1.0 μF | Digi-Key | 587-1231-1-ND |
| 2 | C6, C7 | 4.7 μF | Digi-Key | 445-7395-1-ND |
| 1 | IC1 | Atmel AT90USB1286 (VQFN) | Digi-Key | AT90USB1286-MURCT-ND |
| 1 | IC2 | [MCP1700] LDO Power Regulator | Digi-Key | MCP1700T3302ETT CT-ND |
| 1 | IC3 | [M41T93] - SPI RTC with Batt. Backup | Digi-Key | 497-6303-2-ND |
| 1 | IC4 | Li-Po Charging IC - MCP73831 | Digi-Key | MCP73831T-2ACI/OTCT-ND |
| 2 | Q1, Q2 | Transistor - NPN type | Digi-Key | ZXTN07012EFFCT-ND |
| 1 | D1 | Snub Diode | Digi-Key | SMD1200PL-TPMSCT-ND |
| 1 | Y1 | 16 MHz Resonator | Digi-Key | 490-1198-1-ND |
| 1 | Y2 | 32 Khz Crystal - 12.5 pF | Digi-Key | XC1195CT-ND |
| 1 | X1 | USB Port Micro - Type AB | Digi-Key | A97799CT-ND |
| 1 | BATT | 2 mm spacing R/A SMT JST Connector | Digi-Key | 455-1749-1-ND |
| 1 | CN1 | microSD socket | Digi-Key | 101-00303-68-2-ND |
| 1 | CN2 | 12-pin SMT/ZIF connector (0.5 mm pitch) Horizontal Mount, Bottom Contact type 1-1734592-2 | Digi-Key | A100283TR-ND |
| 1 | SW2 | Pogo Switches | Digi-Key | CKN10231CT-ND |
| 2 | SW1, SW3 | Pogo Switches | Digi-Key | CKN10230CT-ND |
| 1 | COIN_CELL | 3 V Coin Cell - SMT | Digi-Key | P279-ND |
| 1 | BUZZ | Buzzer | Digi-Key | 102-1153-ND |
| 1 | SW Reset | Reset Switch | Digi-Key | P8046SCT-ND |

Many electronic locks use AA or AAA batteries which are physically large. In other cases, small LiPo, coin cell, or other batteries are used but they are not rechargeable. Although these battery types may be used in other embodiments of the invention, they are not preferred.

The preferred design includes a microcontroller which is powered by Lithium Ion Polymer (LiPo) battery. Preferably, the battery is rechargeable. The preferred battery is a Tenergy 852045 with a capacity of 700 mAh, although batteries of different types and capacities may be used as a matter of design choice. Although it is not an essential requirement, the preferred 700 mAh capacity will in certain embodiments provide between about 7-12 months of normal operating usage on a single battery charge.

Preferably, the battery 33 has low-discharge circuit protection. This type of circuit protection will cut-off power flow from the battery if the battery voltage approaches a level low enough to damage the battery 33. Persons skilled in the art will appreciate that this type of circuit protection is important when the battery charge level is relatively low (e.g., if the filing cabinet is left locked for a long period of time). The power flow will be cut-off so that the battery may be re-charged, without damage to the battery, or without the need for replacement of the battery.

When the battery is no longer able to hold a sufficient charge (for example, approx. 700 mAh in the preferred example) then a user may replace the battery by (i) providing a supplemental power supply via the USB Port to open the lock, (ii) removing the electronic lock from the furniture, (iii) removing the back plate, (iv) disconnecting the battery from the electrical leads, and (v) re-installing the new battery within the electronic lock and the electronic lock secured in the storage unit (for example, office furniture). Optionally, a trap door may be provided in the housing to access the battery without having to remove the lock from the furniture. This trap door may be optionally secured so that the door is opened by entering commands on the keypad.

Preferably, a voltage regulator is used to maintain the voltage at a constant 3.3V for the microcontroller. A low-dropout or LDO voltage regulator (MCP1700) may be used because it can operate with a very small input-output differential voltage. The advantages of a low dropout voltage will often include: (i) a lower minimum operating voltage, (ii) a relatively higher efficiency of operation and (iii) relatively lower heat dissipation. The regulating process is preferred to step down the voltage coming from the battery which may vary between about 3.2V to 4.2V and the USB power which may operate at about 5V.

In the preferred embodiment, the lock includes a self-containing charging mechanism and as such does not require an auxiliary charger for the battery. The preferred circuit board includes a preferred LiPo charging integrated circuit (shown in FIG. 19-12), which safely charges the LiPo battery from power sources provided to it through the USB Micro-A Port (preferably 5V rated up to 500 mA). Preferred power sources include a USB power charger, computer or battery powered USB device. In addition, the circuitry may be easily adaptable to allow charging from other sources, such as by way of example, solar charging cells. Other power sources and connection ports may be used.

In the preferred embodiment, the microcontroller controls the logic of the system. The System Software is resident in the microcontroller and controls the operation of the microcontroller. A variety of microcontrollers may be used as a matter of design choice. However, the ATMEL AT90USB1286 was selected in the preferred embodiment, for the following reasons: (i) low power consumption was desired and only 3.3V are required to operate the Microcontroller; (ii) the selected microcontroller supports C and C++ languages for software applications; (iii) the microcontroller includes 8 KB of non-volatile memory which is used to store user and settings data. (Non-volatile memory is not erased due to loss of power.); (iv) the preferred microcontroller supports a microSD memory card which is desirable for extensive data logging; (v) native USB 2.0 support is included which automatically formats and copies data in memory but also supports USB connect and host mode; and (vi) the preferred microcontroller includes 2 internal timers, since two timers are desired in the preferred method of lock operation.

Data inputs in the preferred system include, data inputs from 3 micro switches, a preferred 12-button keypad and a real-time clock. Optional inputs are received from the RFID/NFC antenna.

In the preferred embodiment, the System Software controls the operation of the DC geared motor, buzzer and 3 LEDs. Optionally, the System Software controls the RFID/NFC circuit.

Preferably, the System Software reads and writes data records to the microSD memory card. Preferably, it also enables access to these data records when a computer or USB device is connected via the USB port (or other data port).

Preferably, the System Software maintains a User Database with privileges within the microcontroller EEPROM/flash memory.

During locking and unlocking processes, the System Software compares user codes inputted on the keypad to the permitted codes previously entered in the User Database to limit/control access to the electronic lock.

Although other data ports are available, a USB type port is preferred. The most preferred USB port is of the Micro-A type, although Standard and Mini USB ports could also be used. The Micro-A was selected as a preferred design choice because Micro-A was believed to be (i) evolving into a future standard; (ii) more durable than Mini ports; (iii) the smallest port available and (iv) the lowest cost port available.

The USB port allows charging of the LiPo battery, and access to the data records on the microSD memory card when the USB memory mode is enabled.

Preferably, the keypad connection will accommodate a plurality of alternative keypads. With reference to FIGS. 18 and 18-1, a preferred keypad assembly will have three primary layers: keypad circuit layer, membrane, keypad and optionally an RFID/NFC Antenna.

The preferred keypad is illustrated as a 12-button matrix style membrane keypad with 3 LEDs. The preferred keypad membrane is covered with a cast rubber silicone top.

In the preferred array, the 12 buttons include digits 0-9, an enter key, and a program key. These buttons allow all desirable user controls of the lock, such as for example, inputting user codes to access the lock, setting system variables like adding/removing users and muting the sound (of the buzzer or other audible alarm or warning components), and enabling system modes like the USB access mode of the system's microSD memory card.

Preferably, the real-time clock provides the calculation of UNIX Standard Time. UNIX Standard Time is preferred to date stamp and time stamp entries in the Database. Preferably, the real-time clock has two alternative power sources: the primary LiPo battery 33 and its own battery backup 74 in the event that the main battery 33 loses power. Preferably, a coin cell type battery 74 is used as a battery backup and under ideal conditions may provide about 2.5 years of backup power to ensure accurate timekeeping/data storage.

Preferably, the circuit board includes a microSD memory card for data storage. However, it will be understood that alternative storage systems, including memory cards of any size may be used. In a preferred embodiment, approx. 128 MB of storage space will, ideally, provide storage for up to 350,000 log file entries (e.g., lock openings or closings). Preferably, once the database is full, the System Software will manage the available storage space and delete the oldest records first so that up to 350,000 of the most recent actions are maintained in storage.

In the preferred embodiment, a buzzer 76 provides audible sounds corresponding events such as command success signals or command failure signals and key entry signals. The buzzer may be optionally disabled or enabled.

Figures 1, 17:
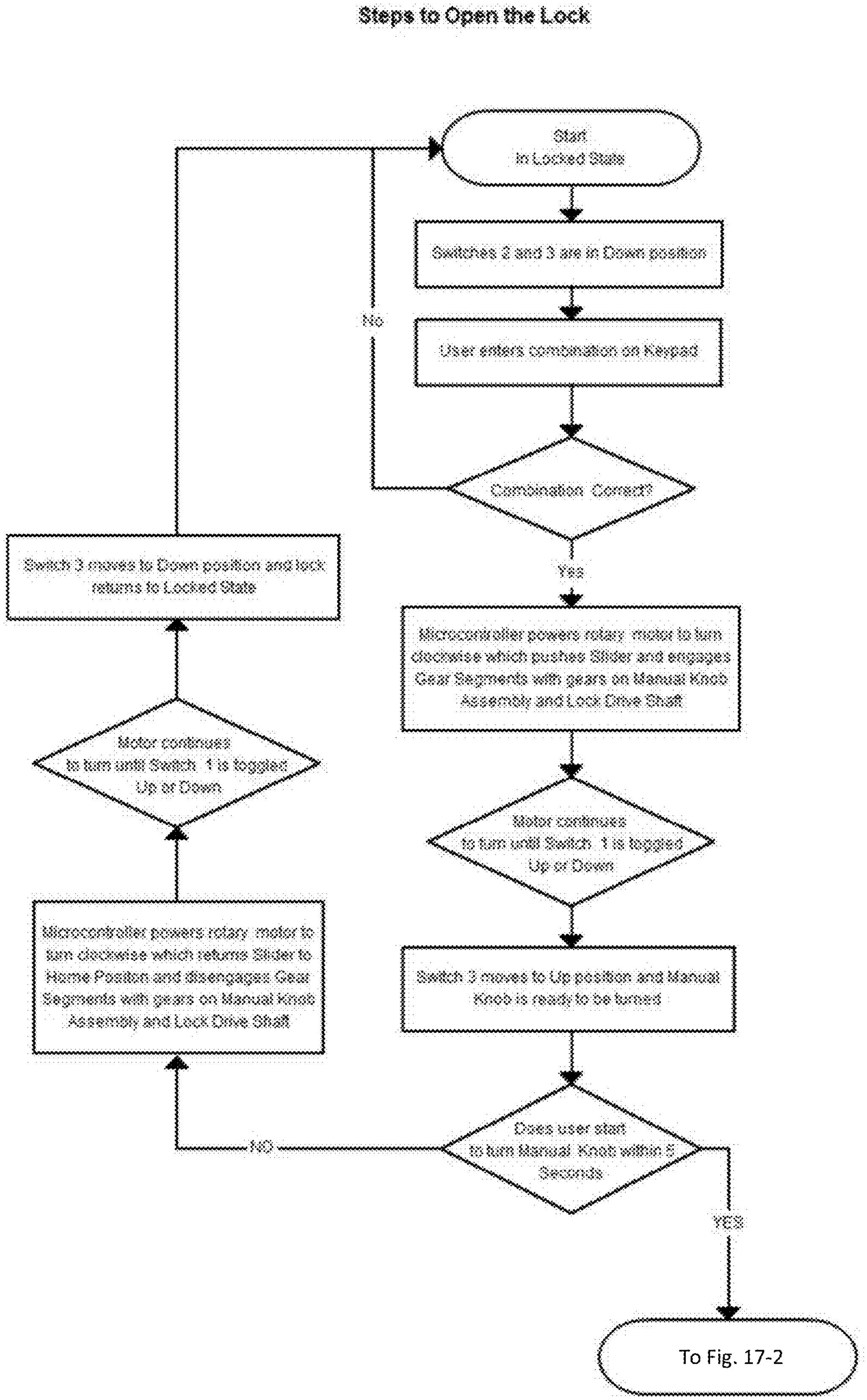
Figures 2, 17:
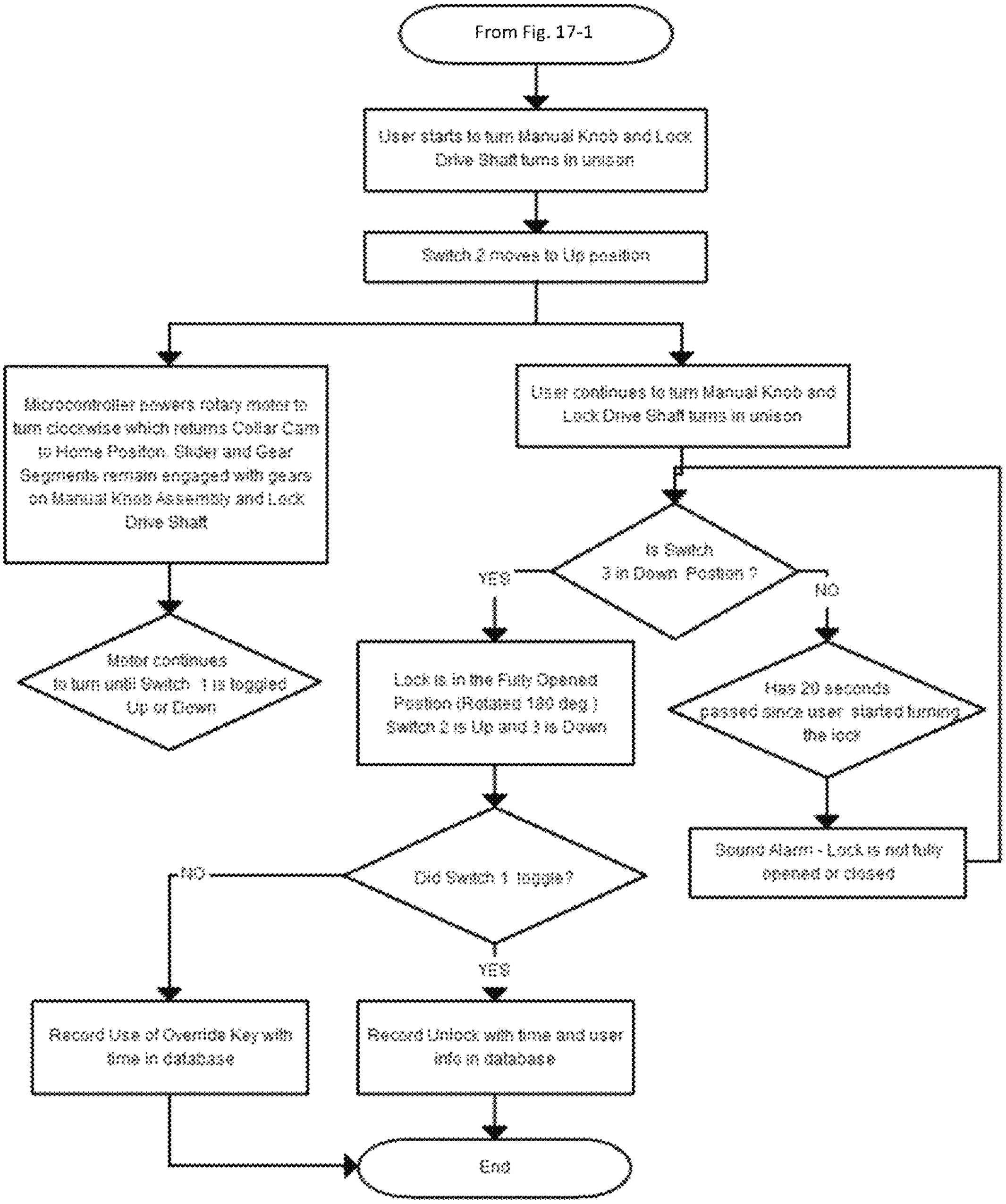
Figures 3, 17:
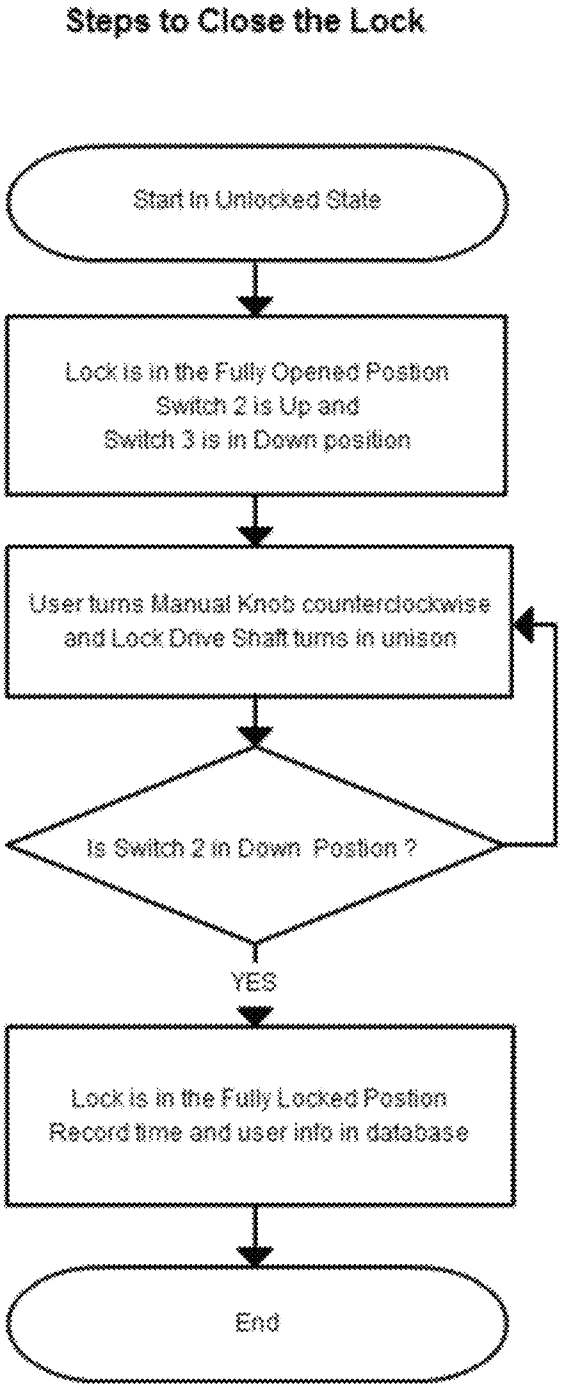

Micro switches 82, 84 and 86 are used by the System Software to manage the processes of opening and closing the electronic lock. In FIGS. 17-1 and 17-2 the preferred Software process of opening the lock is described with the operation of the micro switches 82, 84 and 86. FIG. 17-3 shows the steps to close the electronic lock. FIGS. 4-2 and 4-3 show the three micro switches on the circuit board 40.

Micro Switch 82 ensures that the rotary motor 32 turns precisely through 180° to engage and disengage the slider 28 and gear segment assembly 20. In the preferred embodiment, the rotary motor 32 always turns in a clockwise direction.

Micro switches 84 and 86 are used to detect the rotation of the gear segment assembly 20. In the preferred embodiment, these switches allow the System Software to detect: (i) when the user starts to rotate the manual knob 14, (ii) when the user completes the 180° rotation and the lock is open, (iii) if the manual knob is partially turned but not turned sufficiently to completely open the lock, (iv) when the lock is closed and locked, (v) and if the lock drive shaft is turned and the keypad was not used (i.e., if the manual override key was used).

Figure 21:
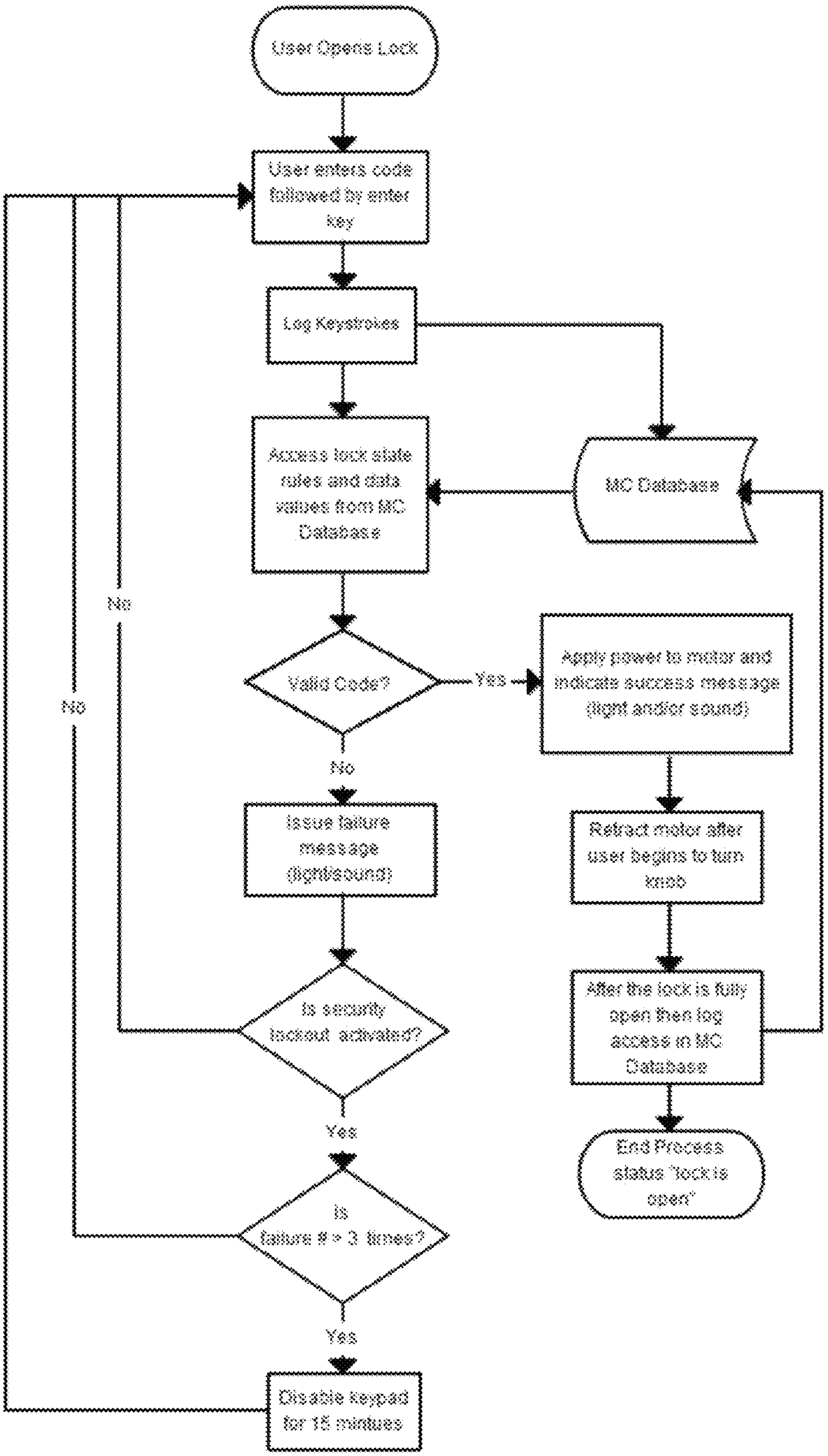
FIG. 21 is a flowchart illustrating an example of a method of operating an electronic lock of the present invention.

FIG. 21 illustrates a flowchart of the operational steps of the preferred System Software used to control the operation of the electronic lock. As the user enters a passcode or other data on the keypad, the System Software logs each keystroke and stores the key sequences in the database for an audit trail.

To validate a passcode, the microcontroller 78 accesses the database files to determine valid user codes and any rules and data values that have been applied or placed into effect for the electronic lock. For example, the lock may be set to be opened only for a specified period of time, during a limited time, during certain days. In some embodiments, other limitations and rules may be programmed into the System Software and the microcontroller 78.

The optional behaviors of the lock during the opening and closing process may be programmed for control by rules and data values entered into the System Software. For example an optional audible sound may be given for success messages and failure messages. In another example, a prescribed security time lockout may be activated if a passcode is incorrectly entered a specified number of times (for example, 3 incorrect entries).

Preferably, the System Software also records the user information, date and time when the lock was opened, failed attempts to open the lock, and the date and time that the lock was locked. Preferably time is recorded in Standard UNIX Time.

Figure 22:
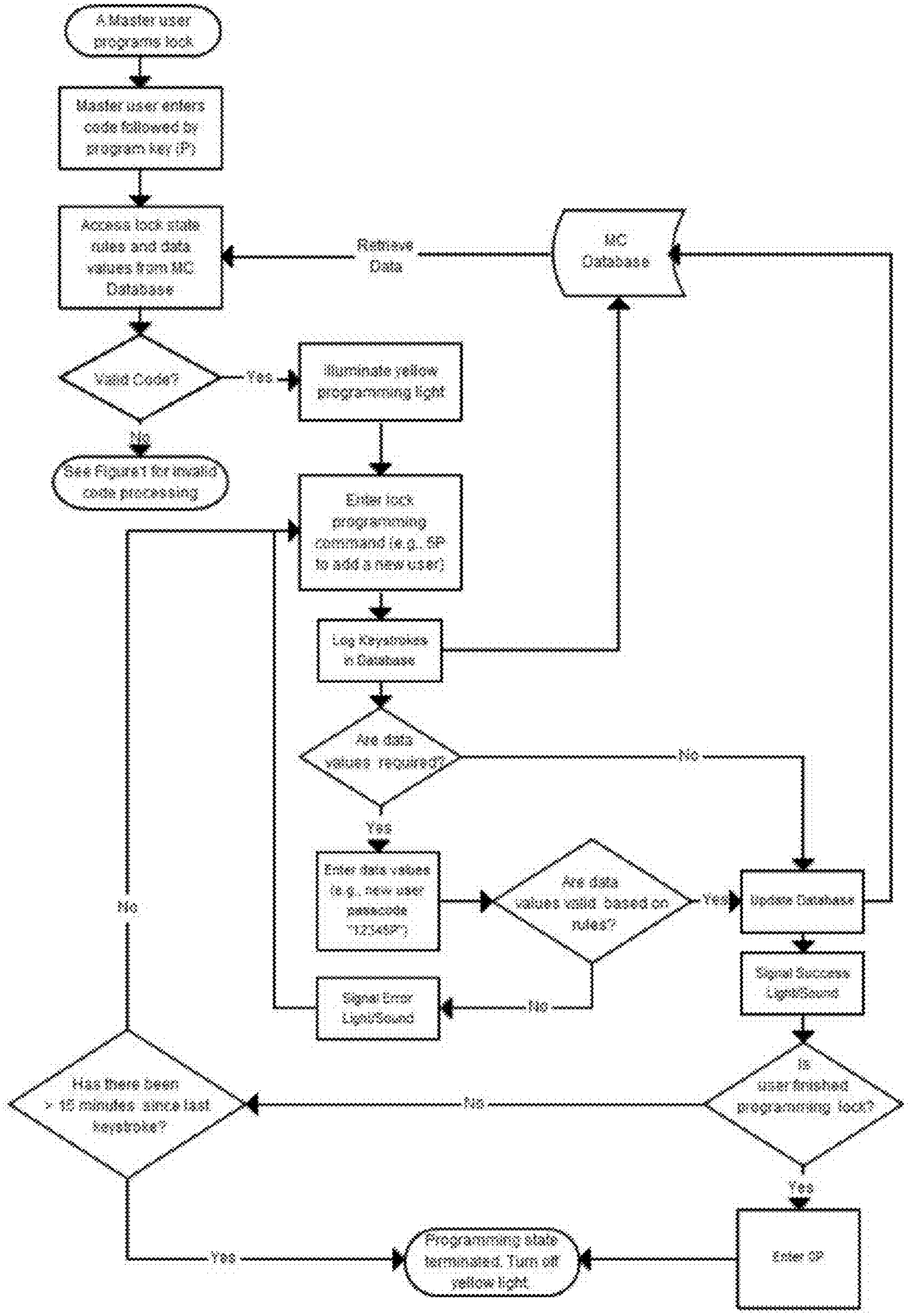
FIG. 22 is a flowchart illustrating an example of a method of programming the operational steps of an electronic lock of the present invention.

FIG. 22 illustrates a flowchart of the operational steps of the preferred System Software which controls the entry of user and master codes. Preferably, locking rules and data values may also be entered, edited and deleted through the keypad. Similar to method steps outlined in FIG. 21, the System Software preferably logs each keystroke and stores the key sequences in the database for an audit trail. Lock rules and associated data values may be stored in the microcontroller database.

FIG. 23 shows the list of preferred programming commands. As a matter of preference, programming commands are restricted to a limited number of users, preferably one of the Master Users. Regular (i.e., Non-Master) users may issue a limited number of programming commands, such as for example, to change their own passcode and to check the main battery level.

FIG. 24 shows the preferred selection of micro controller Database files for the electronic lock. These files are stored on either the microcontroller internal memory or the microSD memory card. These data files may be extracted by one of the Master Code Users for reporting and review of the electronic lock's audit trail. In the preferred embodiment, two alternative approaches may be used to extract these files: through USB Connect and USB Host.

In the USB Connect Mode, a standard USB to USB Micro-A cable (not shown) is first inserted into a laptop or other computer (also not shown) and the Micro-A connection is inserted into the USB port 17 in the electronic lock. The charging circuitry of the lock will activate and begin to charge the LIPO Battery.

After successfully entering the Master Passcode, the user enters predetermined commands, for example, '11' then followed by 'P', to activate data accessibility across the USB port. Preferably, a colored light (for example, yellow indicator light) will glow steadily when the USB data access mode has been enabled. The electronic lock's Database will show up on the computer as a mass storage drive, similar to the files presented on a USB memory stick. The user would then be able to access and copy the files onto the computer or open them with an application on the computer (e.g., Microsoft XL). Once finished, the Master User will then enter predetermined commands such as '11' and then 'P', to disable the USB data access mode and the colored indicator light will turn off.

In the USB Host Mode, a standard USB memory stick (not shown) is connected to the USB port 17 with a USB to USB Micro-A connector cable (not shown). After entering the Master Passcode, the user enters predetermined commands '13' and then 'P' to activate the USB port and the yellow indicator light will glow steadily. A green indicator light flashes as the database files are copied to the USB memory stick. The Master User then enters predetermined commands, such as '13' and then 'P', to disable the USB data access connection and the yellow indicator light turns off. The user would be able to copy the files from the USB memory stick (not shown) onto the computer (also not shown) or open them with an application on the computer (for example, Microsoft XL).

Preferably, the USB Connect Mode also allows a user, such as the Master User, upload a file containing "user privileges" (a "user privileges file") to be uploaded from a computer (not shown) connected through the USB port 17. After the Master User successfully enters the Master Passcode, the user enters predetermined commands, such as '14' and then 'P', to activate the USB port 17 in write mode. The yellow indicator light will then glow steadily when the USB mode has been enabled. The lock Database will show up on the computer as a mass storage drive, similar to the manner in which files are listed and presented on a USB memory stick. The user may then copy the user privileges file from the computer to the electronic lock drive. Preferably, a second indicator light, such as a green light, flashes as the user privileges file is being coped to the electronic lock drive. The Master User then enters the associated predetermined codes, such as '14' and then 'P', to disable the USB mode and the yellow indicator light turns off.

FIG. 6 illustrates the preferred components in the circuit board 40, including an optional RFID/NFC Antenna within the keypad and RFID/NFC Circuit.

Figure 20:
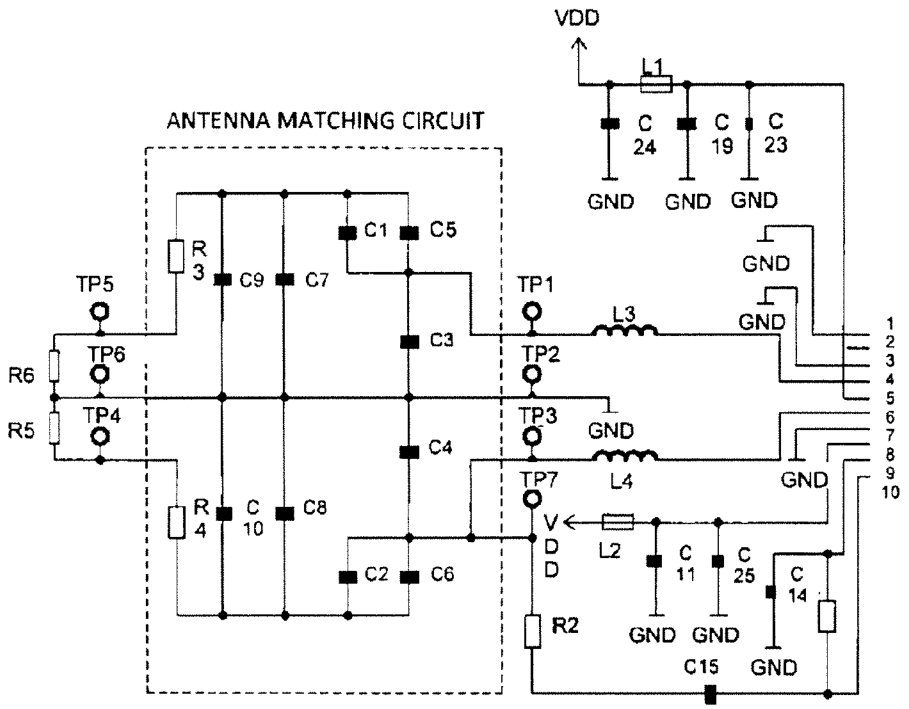
Figures 1, 20:
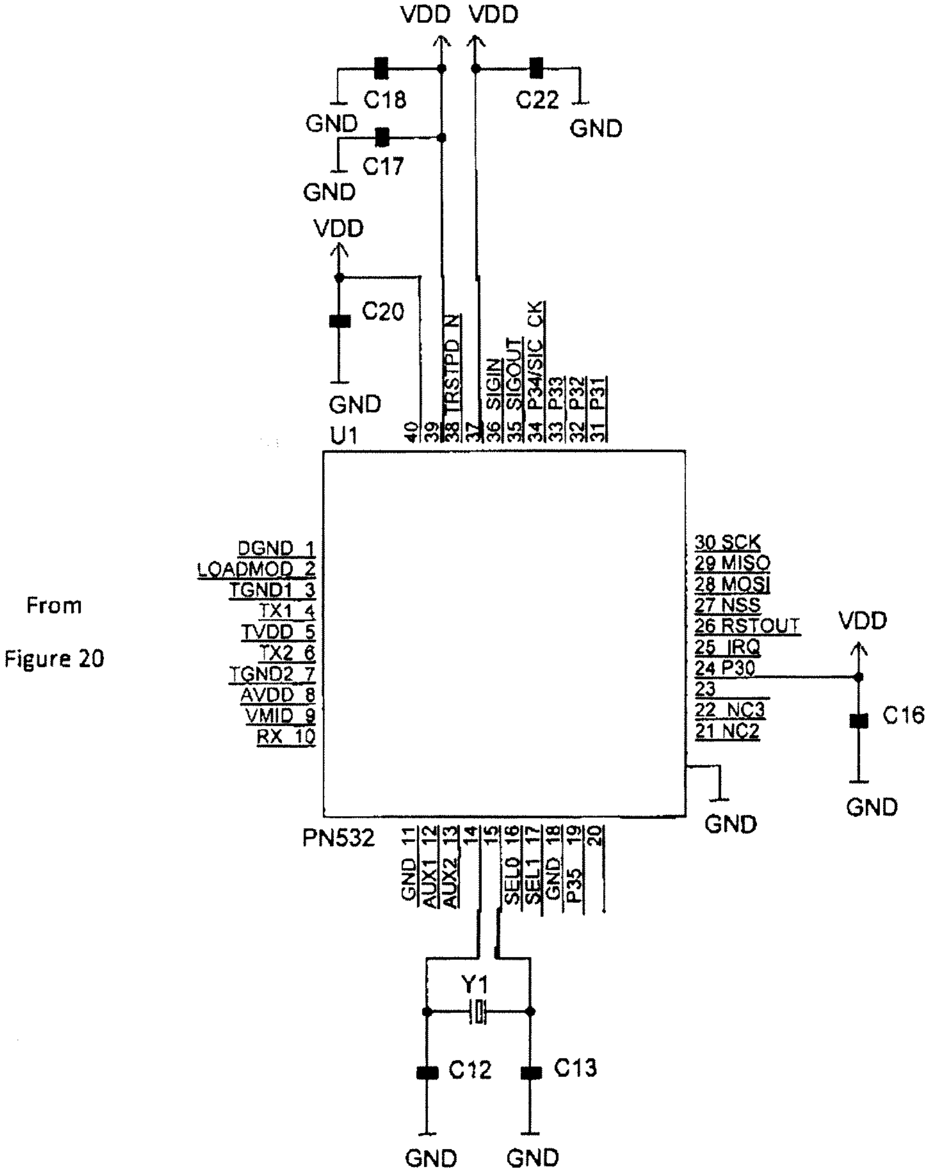

FIGS. 20 and 20-1 to 20-3 show the schematics and related component specifications for the RFID/NFC Antenna and RFID/NFC Circuit.

In the preferred embodiment, the RFID antenna may be made of a 2D coil design for a 125 kHz RFID antenna and made of printed copper onto a custom designed footprint and whose capacitor has been tuned so the read frequency is optimized to support 125 kHz RFID tags placed in close proximity to the keypad.

Preferably, the System Software supports the following RFID functions: (1) enable or disable optional RFID mode; (2) add or remove one or more RFID Tags; (3) Activate RFID mode once this function has been enabled and (4) Read RFID Tag.

Preferably, a Master User may enable the RFID mode by entering the programming mode as described above and then entering a corresponding predetermined command such as "20 P". Once the appropriate command has been accepted, RFID tags can be added. This is performed by entering another predetermined command such as "21P", followed by the step of bringing the valid RFID card or tag within proximity, typically within a few centimeters of the antenna. An indicator light, such as a green light, and an audible success sound may be programmed to notify the user if the RFID tag has been added.

Once the RFID mode is enabled and the RFID tag has been successfully added, the user having this tag may open the electronic lock by bringing the RFID tag within range of the keypad. To do this, the user will first push a predetermined command, such as the Enter button, to activate the RFID mode and then bring the tag within close proximity to the electronic lock. If the RFID tag is successfully validated, an indicator light, such as a green light and an audible success sound, will be returned and the user will be allowed to rotate the manual knob, as described more fully above, to operate the lock. Optionally, the RFID function may operate in low power mode to listen for RFID tag signal(s). This may eliminate the need for the user to press a key to reactivate the system. Once the RFID tag comes close to the antenna (e.g. within a few centimeters) the presence of an RFID tag first wakes up the system and then RFID tag is read.

NFC-enabled devices can act as electronic identity documents or keycards. As NFC has a short range and supports encryption, it may be more suitable than earlier, less secure RFID systems.

NFC is a set of short-range wireless technologies, typically requiring a distance of 4 cm or less. NFC operates at 13.56 MHz on ISO/IEC 18000-3 air interface and at rates ranging from 106 KBS to 424 KBS.

Preferably, the electronic lock is the initiator which actively generates an RF field that can power a passive target. The NFC targets to take very simple form factors such as tags, stickers, key fobs, or cards that do not require batteries. NFC Targets may also include a variety of NFC-enabled smartphones including selected models of Google Nexus, Samsung Galaxy, RIM Blackberry, Apple IPhone, and many other examples of smartphones.

The operation of the electronic lock with passive NFC targets such as key fobs and cards is similar to the RFID mode as described above. Operation of the lock may also be performed from NFC-enabled smartphones in either of two modes: (i) Smart card-emulation mode allows the emulation of a contactless smart card or (ii) a Dedicated System Application saved on the smartphone which is enabled to transmit encrypted codes in a peer-to-peer mode between the smartphone and the RFID/NFC features provided on the electronic lock.

In the preferred embodiment, the System Software supports the following NFC functions: (1) enable or disable optional NFC mode; (2) Add or remove one or more NFC Targets; (3) Activate NFC mode once this function has been enabled and (4) Read NFC Tag.

In a preferred embodiment, the electronic lock is shipped with preloaded software and other information such as a unique internal serial number dedicated to each electronic lock. In the event that the Master Codes are lost for a particular device, the preferred electronic lock is provided with a secure preloaded program to execute a factory reset. This process will restore all of the lock defaults and set the master password to a known number. The preferred System Software may contain an encryption algorithm so that a unique factory reset code may be issued for each unique electronic lock Serial Number. In addition, the preloaded program may provide that this unique reset code will only be accepted by the specific electronic lock having the correct, corresponding Serial Number. The reset code may be programmed to be valid for a limited period of time as specified by the manufacturer.

An encryption algorithm may also provide a secure code combination for daily use of the lock. For example, this feature could be utilized in corporate hoteling uses where visiting employees could periodically use a free desk for a day. It could also be used for a day locker in public areas. A computer application may be provided to generate an encrypted code that would work for a specific time period or until the code is changed. The computer application may be synchronized with a specific lock so that the code will be unique to that lock.

Persons skilled in the art will appreciate that the foregoing descriptions were directed to specific embodiments of the invention. However, many other variations and modifications of the invention are also possible. Several preferred embodiments of the invention have been described with regard to the appended drawings. It will be apparent to those skilled in the art that additional embodiments are possible and that such embodiments will fall within the scope of the appended claims.

PARTS LIST

Prior Art
FIG. 1 and FIG. 2
A crank arm
B irregularly shaped driver
C retainer
E locking core
F lock housing unit
G two drawer locking cabinet
Embodiments of the Invention
FIG. 3
1 electronic lock
3 lock housing
5 "Double D" shaped housing insert
7 drive shaft

9 driver
11 manual knob assembly
13 bypass (override) key core
15 keypad
17 USB port and cover
FIG. 4-1
20 gear segment assembly
21*a* first cam segment
21*b* second cam segment
22 front drive gear assembly
24 rear drive gear assembly
27*a* torsion spring
28 slider
29 first slider cam
30 collar cam
32 motor
FIG. 4-2
17 USB port
72 real-time clock
74 clock battery
76 buzzer
78 microcontroller
80 micro SD storage
84 micro switch 2
86 micro switch 3
FIG. 4-3
82 micro switch 1
87 LiPo charger and voltage regulator
90 keypad connector
FIG. 5
3*a* housing frame
3*b* housing front plate
3*c* collar
3*f* chassis
3*g* mounting bracket
4 interchangeable housing back plate
4*a* "Double D" shaped housing plug insert
12 index spring
12*a* window lens
14 knob grip
14*a* knob
14*b* knob barrel
14*c* knob barrel cap
22 front drive gear
14*e* inner cam surface
14*f* inner cam
17 USB port cover
18 USB gasket
20*a* front gear segment
20*b* rear gear segment
20*c* gear segment sleeve
24*a* rear drive gear segment
27 (second) torsion spring
27*a* torsion spring
28*a* second ramped surface on slider cam 29
28*b* second slider cam
29 first slider cam
31 indicator
33 battery
40 circuit board
42 keypad circuit
44 keypad membrane
44*a* gasket
45 indicator light array
FIG. 6-1
1 electronic lock
3 lock housing
4 housing back plate
4*a* "Double D" shaped housing plug insert
7 drive shaft
7*a* shortened drive shaft
9 driver (illustrated as a cammed driver)
9*a* embodiment of an alternative driver base
FIG. 8-1
See above
FIG. 8-2
CW clockwise rotation
FIG. 8-3
See above
FIG. 8-4
$CW_1$ clockwise rotation
FIG. 8-5
$CW_2$ clockwise rotation
FIG. 9
CCW counter clockwise rotation
FIGS. 10-1 to 10-3
K key
3*h* aperture
3*j* positioning rest
13*b* horseshoe shaped extension
14*g* irregular slot
20*d* channel
20*x* gear lobe
24*e* recess
28*x* slider lobe
50 dog
52 cam follower
60 modular chassis assembly
FIGS. 15-1, 15-2
24*t* ramped surface
31*s* indicator tab (cam follower)

We claim:

1. A method of operating an electronic lock having an internal power reservoir, the method comprising:

enabling a programmable passcode validated by a controller within the electronic lock for motorized operation of a gear assembly in the electronic lock, powered by the power reservoir; and sliding the gear assembly along a slide axis between a disengaged position and an engaged position, wherein:

in the disengaged position, a manual drive assembly defining a manual drive axis in the electronic lock is disengaged from a lock assembly in a storage unit; and the manual drive assembly is operatively connected to the lock assembly when the gear assembly slides along the slide axis transversely and inwardly toward the manual drive axis to the engaged position, to permit manual movement of the manual drive assembly between a first position in which the lock assembly is in a locked position, and a second position in which the lock assembly is in an unlocked position.

2. In the method of claim 1, the passcode is provided by a step selected from the group of steps consisting of: entering the passcode in a keypad in the electronic lock; positioning a RFID device adjacent the electronic lock; positioning an NFC device adjacent the electronic lock; and communicating the passcode from a permitted electronic device, and the controller validates the passcode with a data set of valid programmable passcodes stored in a memory device in the electronic lock; and wherein the gear assembly slides along the slide axis by: (i) motorized operation powered from the power reservoir or (ii) a manually operated bypass control.

3. The method of claim 1 wherein the sliding movement of the gear assembly is motorized and powered from the power reservoir or manually operated by a bypass control, from the disengaged position to the engaged position to operatively engage a first portion of the manual drive assembly with a second portion of the manual drive assembly.

4. The method of claim 1 comprising:

applying power from the power reservoir to a motor for motorized operation of the gear assembly between the disengaged position and the engaged position; and discontinuing power to the motor after the gear assembly slides between the disengaged position and the engaged position.

5. The method of claim 4 comprising: operatively engaging a first portion of the manual drive assembly with a second portion of the manual drive assembly when the gear assembly is in the engaged position.

6. The method of claim 5 comprising:

applying power from the power reservoir to the motor for motorized linear sliding movement of the gear assembly along the slide axis between the disengaged position and the engaged position, transverse to the manual drive axis, to provide a geared connection between the first portion of the manual drive assembly and the second portion of the manual drive assembly.

7. The method of claim 1 comprising storing a data set in a memory element in the electronic lock, wherein the data set is selected from the group of data sets consisting of information identifying:

a user of the electronic lock;

an unsuccessful attempt to access the electronic lock;

a successful attempt to access the electronic lock;

the data and time of an attempt to access the electronic lock;

one or more users permitted to operate the electronic lock; and one or more Master Users permitted to access or modify restricted information stored in the memory element.

8. The method of claim 1 comprising:

accessing the electronic lock by taking a step selected from the group of steps consisting of:

providing a predetermined access code;

activating a manual bypass element to permit access to the electronic lock without motorized operation of the gear assembly; and applying an external power source to a motor for the motorized operation of the gear assembly between the disengaged position and the engaged position when an internal power source in the electric lock is unable to power the motor.

9. An electronic lock comprising:

an internal reservoir to supply power to a motor for selective motorized operation of a gear assembly in the electronic lock;

a controller configured to validate a programmable passcode for motorized operation of the gear assembly, wherein the motor is configured to slide the gear assembly along a slide axis between a disengaged position and an engaged position, wherein in the disengaged position, a manual drive assembly defining a manual drive axis in the electronic lock is disengaged from a lock assembly in a storage unit, and wherein the manual drive assembly is operatively connected to the lock assembly when the gear assembly slides along the slide axis transversely and inwardly toward the manual drive axis to the engaged position, to permit manual movement of the manual drive assembly between a first position, in which the lock assembly is in a locked position, and a second position, in which the lock assembly is in an unlocked position.

10. A programmable system comprising the electronic lock claimed in claim 9, wherein:

the controller validates the programmable passcode by accessing data stored in a memory device, the motor slides the gear assembly along the slide axis transversely toward a longitudinal axis defined by the manual drive assembly, upon entry of the programmable passcode, the manual drive assembly extending from a proximate outer wall of the electronic lock inwardly toward the lock assembly operatively associated with at least one storage compartment in the storage unit, and when in the engaged position, the gear assembly operatively engages the manual drive assembly to permit an operator to manually lock and unlock the lock assembly, and when the gear assembly is in the disengaged position, the manual drive assembly not allow the operator to manually lock and unlock the lock assembly.

11. In the programmable system claimed in claim 10, when the gear assembly slides transversely and inwardly along the slide axis to the engaged position, a first gear in the gear assembly is operatively connected to a first drive gear in the manual drive assembly, a second gear in the gear assembly is operatively connected to a second drive gear in the manual drive assembly, to operatively connect the first drive gear to the second drive gear; and when the gear assembly slides transversely and outwardly along the slide axis, the first and second gears in the gear assembly are operatively disconnected from the first drive gear and the second drive gear to operatively disconnect the first drive gear from the second drive gear.

12. The programmable system claimed in claim 10 comprising:

a manual bypass to permit operative connection of the gear assembly to the manual drive assembly without motorized operation of the gear assembly, the manual bypass comprising a slide supporting the gear assembly, wherein the slide is configured for manually powered sliding movement of the gear assembly transversely to the longitudinal axis between the disengaged position and the engaged position.

13. In the programmable system claimed in claim 12, the manual bypass is lockable to prevent unauthorized use of the manual bypass to operatively connect the gear assembly to the manual drive assembly and to prevent unauthorized operation of the lock assembly.

14. In the programmable system claimed in claim 11, the electronic lock comprising a group of electronic components, the group comprising:

a battery providing the power reservoir for operation of the motor;

a switch associated with the motor, to affect the operation of the motor according to the position of the gear assembly along the slide axis;

a switch to shut off power to the motor after the gear assembly slides along the slide axis between the disengaged position and the engaged position;

the memory device for storing data associated with the electronic lock;

a data access port associated with the memory device;

a real time clock for associating real time data with use of the electronic lock; and an access element selected from the group of elements consisting of: a keypad for entering a predetermined access code; a device reader; and a receiver to receive an access code from a permitted electronic device.

15. The programmable system claimed in claim 14 comprising:

a lockable manual bypass in the electronic lock to permit authorized access to the electronic lock and to bypass motorized operation of the gear assembly; and a slide element supporting the gear assembly, wherein the slide element is configured for manually powered sliding movement of the gear assembly transversely to the longitudinal axis and between the disengaged position and the engaged position.

16. In the programmable system claimed in claim 11, the manual drive assembly comprising:

a first portion for selective operational connection with the lock assembly when the gear assembly is slidingly positioned along the slide axis in the engaged position, and the first portion being operationally disengaged from the lock assembly when the gear assembly is slidingly positioned along the slide axis in the disengaged position.

17. In the programmable system claimed in claim 16, the manual drive assembly comprising a second portion operationally connecting with the first portion when the gear assembly is in the engaged position.

18. In the programmable system claimed in claim 15, the lockable manual bypass configured to manually slide the slide element and the gear assembly along the slide axis between the disengaged position and the engaged position, to permit manual operation of the drive assembly, and to bypass motorized operation of the gear assembly.

19. In the programmable system claimed in claim 14, the electronic lock comprising a removable chassis supporting the motor, the gear assembly mounted on a slide element for transverse sliding movement along the slide axis defined by the removable chassis, a circuit board, the controller and a majority of the electronic components selected from the group of electronic components, for:

testing one or more of the motor, the gear assembly, the slide element, the circuit board, the controller, and the majority of electronic components supported on the chassis when the chassis is outside of the electronic lock;

replacing one or more of the motor the gear assembly, the slide element, the circuit board, the controller, or one or more of the selected electronic components when the chassis is outside of the electronic lock; and installing the chassis into the electronic lock after the testing and replacing steps are completed.

20. In the programmable system claimed in claim 14, wherein the battery is rechargeable, the memory device is a removable storage device, the data access port is a USB port, the real time clock is associated with a back up clock battery, the device reader is a card reader, and the permitted electronic device is selected from the group of permitted devices consisting of: a computer, a mobile personal communication device, an NFC enabled device, and an RFID enabled device.

21. A software program embodied on a non-transitory computer storage medium for operating the programmable system claimed in claim 11 comprising:

providing the programmable passcode from a permitted electronic device to the controller and validating the programmable passcode via the controller by comparing the programmable passcode with data stored in the memory device, for motorized sliding movement of the gear assembly along the slide axis transverse to the longitudinal axis, powered by the power reservoir, between the disengaged position and the engaged position.

22. A software program embodied on an non-transitory computer storage medium for operating the programmable system claimed in claim 14 comprising:

providing the programmable passcode from a permitted electronic device to the access element and validating the programmable passcode via the controller by comparing the programmable passcode with data stored in the memory device, for motorized movement of the gear assembly along the slide axis, powered by the power reservoir, between the disengaged position and the engaged position.

23. In the method claimed in claim 1, the gear assembly comprises a first gear segment operatively connected to a second gear segment;

the manual drive assembly comprises first and second shaft segments, the first shaft segment comprises a first drive gear, the second shaft segment comprises a second drive gear; and when in the engaged position, the first gear of the gear assembly operatively engages the first drive gear, and the second gear of the gear assembly operatively engages the second drive gear.

* * * * *